(12) United States Patent
Ryland et al.

(10) Patent No.: US 8,453,533 B2
(45) Date of Patent: Jun. 4, 2013

(54) FOUR DEGREE OF FREEDOM (4-DOF) SINGLE MODULAR ROBOT UNIT OR JOINT

(75) Inventors: Graham Ryland, West Sacramento, CA (US); Harry H. Cheng, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 13/456,395

(22) Filed: Apr. 26, 2012

(65) Prior Publication Data

US 2012/0204670 A1     Aug. 16, 2012

Related U.S. Application Data

(63) Continuation of application No. PCT/US2011/023776, filed on Feb. 4, 2011.

(60) Provisional application No. 61/302,010, filed on Feb. 5, 2010.

(51) Int. Cl.
*B25J 17/00* (2006.01)
*B25J 11/00* (2006.01)

(52) U.S. Cl.
USPC ............ 74/490.05; 901/1; 901/27; 74/490.07

(58) Field of Classification Search
USPC ................. 74/490.01, 490.05, 490.07; 901/1, 901/27
See application file for complete search history.

(56) References Cited

U.S. PATENT DOCUMENTS

| | | | | |
|---|---|---|---|---|
| 4,109,398 A | * | 8/1978 | Hida | .............................. 434/370 |
| 4,766,775 A | * | 8/1988 | Hodge | ....................... 74/490.01 |
| 5,428,713 A | * | 6/1995 | Matsumaru | .................... 700/245 |
| 5,523,662 A | | 6/1996 | Goldenberg et al. | |
| 6,084,373 A | * | 7/2000 | Goldenberg et al. | .... 318/568.11 |
| 6,323,615 B1 | | 11/2001 | Khairallah | |
| 6,568,869 B1 | | 5/2003 | Murata | |

(Continued)

FOREIGN PATENT DOCUMENTS

| | | |
|---|---|---|
| JP | 05-111885 A | 5/1993 |
| JP | 05-245784 A | 9/1993 |

(Continued)

OTHER PUBLICATIONS

Korean Intellectual Property Office (KIPO), International Search Report and Written Opinion issued on Oct. 25, 2011, including claims searched, related PCT International Patent Application No. PCT/US2011/023776, pp. 1-14.

*Primary Examiner* — David M Fenstermacher
*Assistant Examiner* — Terence Boes
(74) *Attorney, Agent, or Firm* — John P. O'Banion

(57) ABSTRACT

A module of a center link pivotably connected to two outer links has continuously rotatable faceplates rotatably disposed on the two outer links, thereby creating four degrees of freedom (4-DOF). Modules may be connected via faceplates to produce a "snake" assembly. A single module may move forward in a straight line through simultaneous rotation of the two faceplates. By reversing the rotation of the faceplates, the module may turn in its own length. By sequentially pivoting the outer links relative to the center link, an "inch worm" movement may be used to move the module. Interconnections of two or more modules increase the number of available degrees of freedom, and increase the flexibility of the resultant assembly. Apertures in the faceplates and the outer links allow for interconnection of modules and allow for electrical power and signal connections. A battery housed in the center link provides power for each module.

10 Claims, 30 Drawing Sheets

U.S. PATENT DOCUMENTS

| | | | |
|---|---|---|---|
| 6,636,781 B1 * | 10/2003 | Shen et al. | 700/248 |
| 6,686,717 B2 | 2/2004 | Khairallah | |
| 7,013,750 B1 * | 3/2006 | Kazami | 74/490.05 |
| 8,175,747 B2 * | 5/2012 | Lee et al. | 700/247 |
| 8,234,950 B1 * | 8/2012 | Shen et al. | 74/490.05 |
| 2010/0292836 A1 * | 11/2010 | Cheung et al. | 700/245 |

FOREIGN PATENT DOCUMENTS

| | | |
|---|---|---|
| JP | 2003-103063 A | 4/2003 |
| KR | 10-2006-0095266 A | 8/2006 |
| WO | 99-01261 A1 | 1/1999 |

* cited by examiner

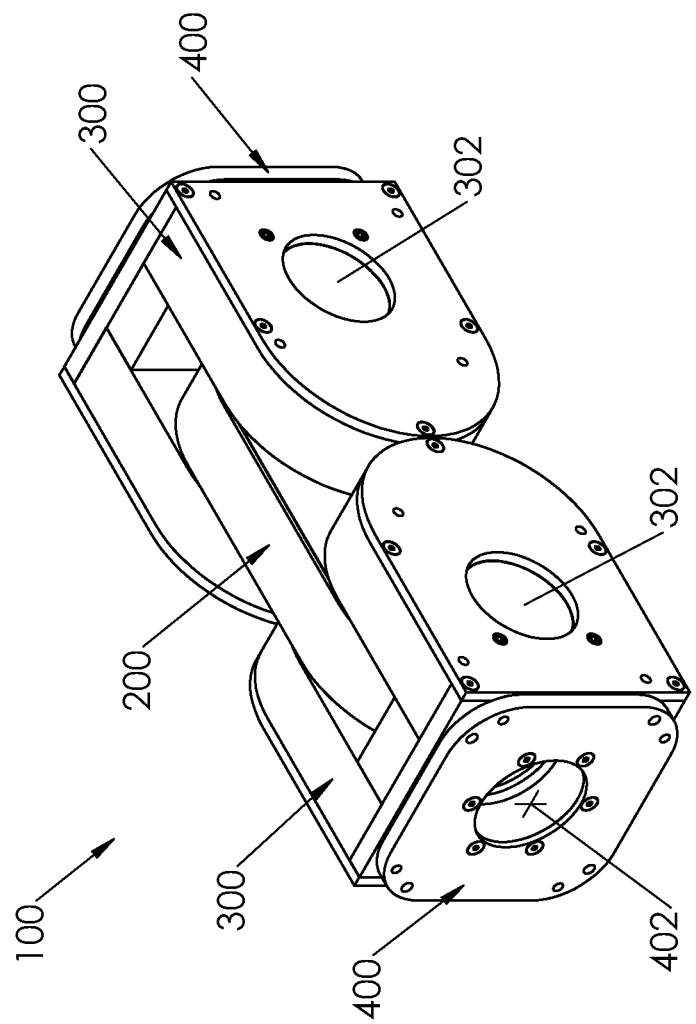

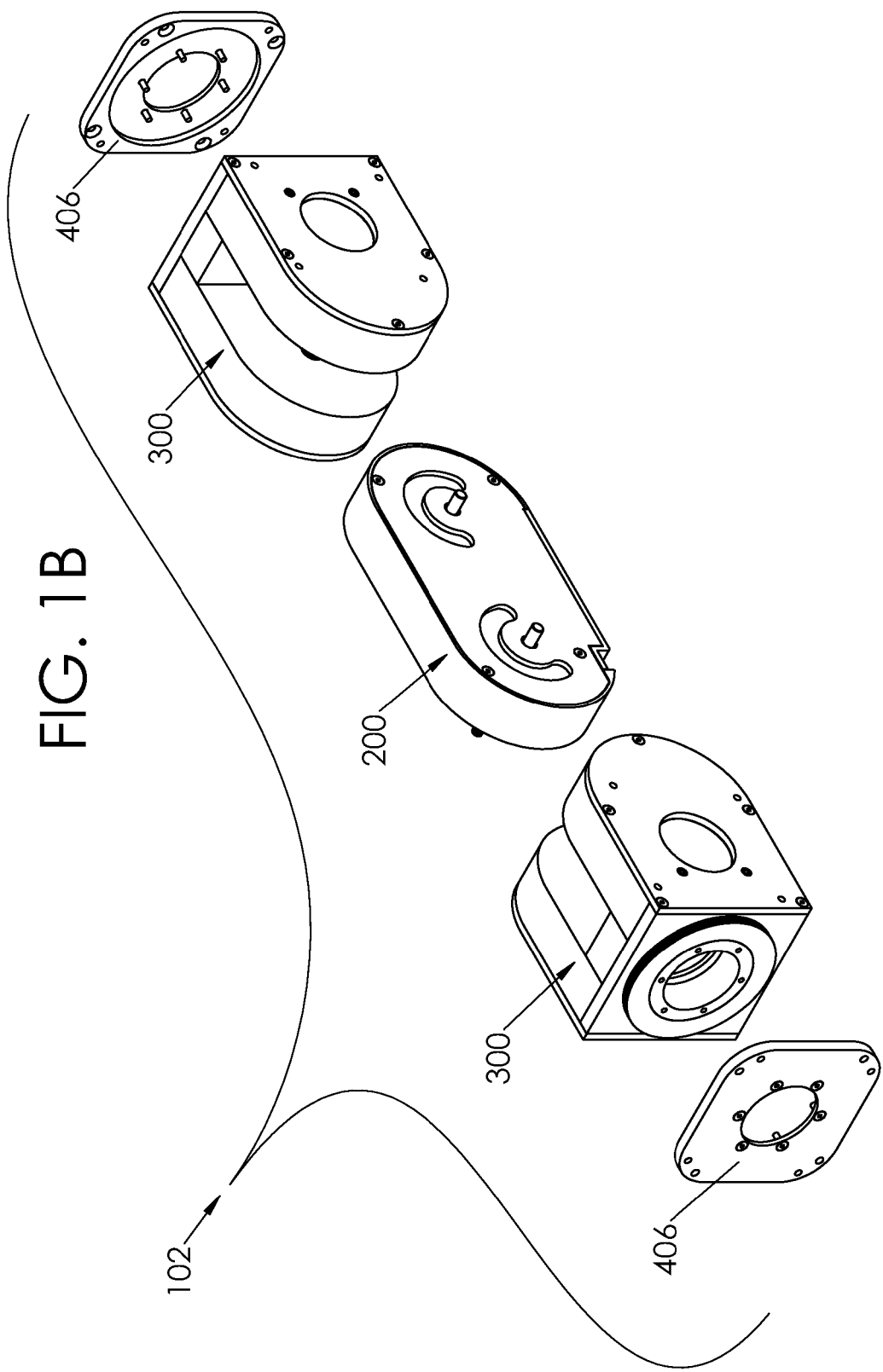

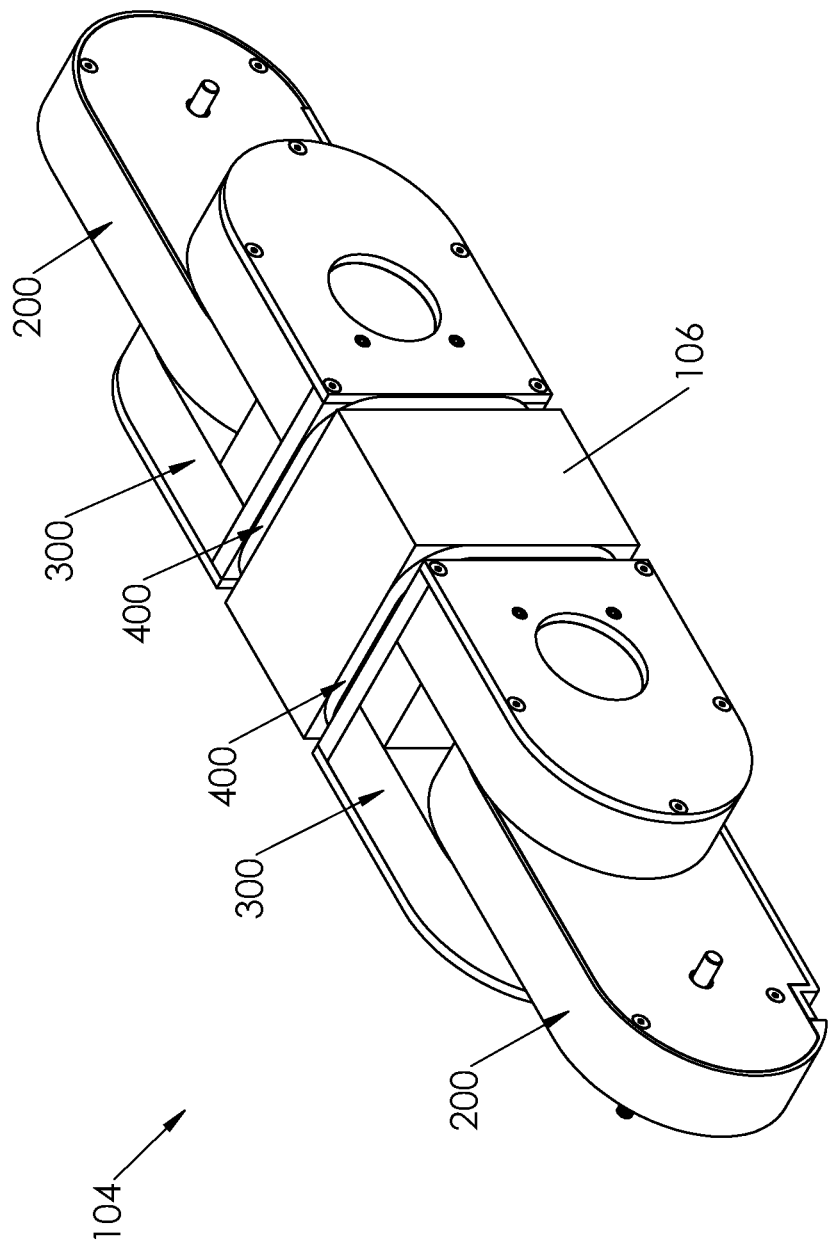

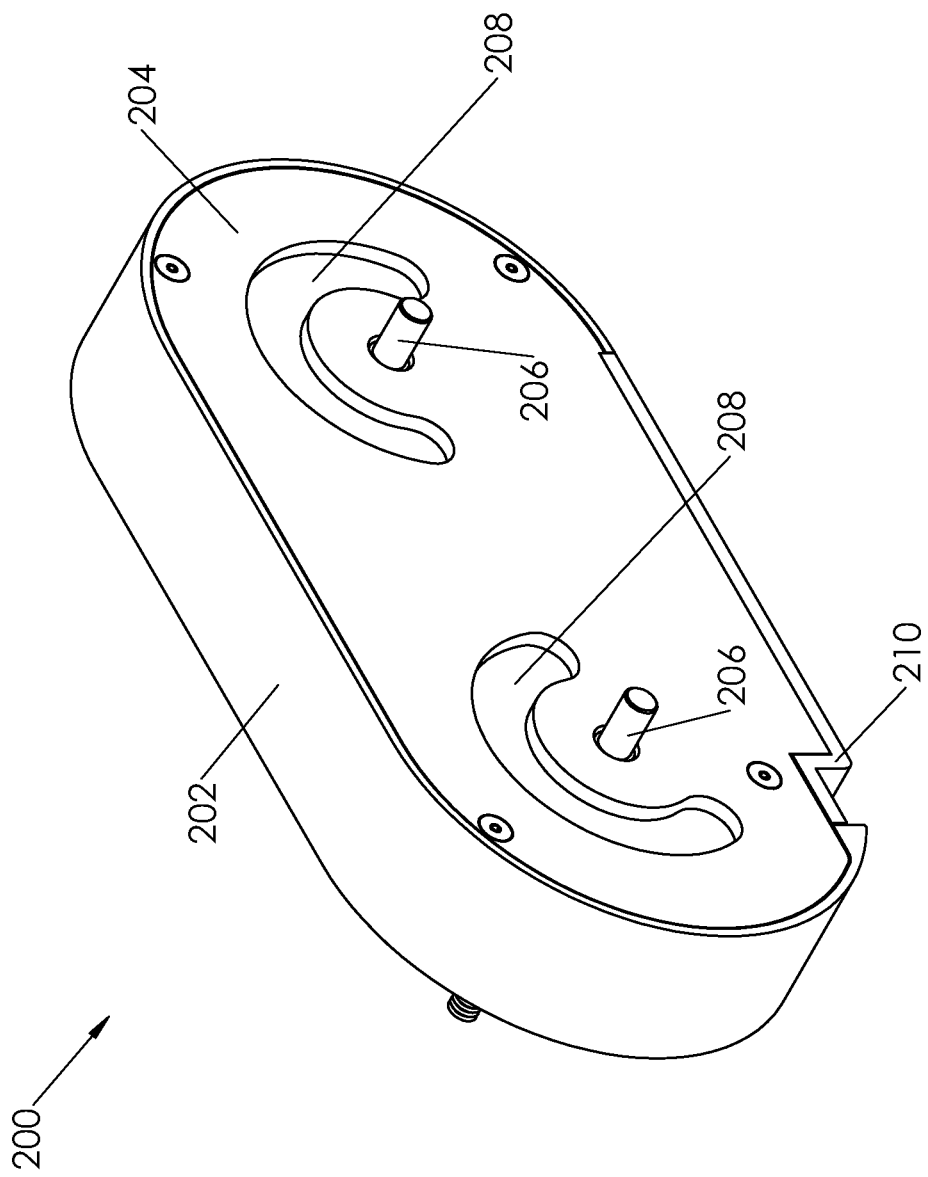

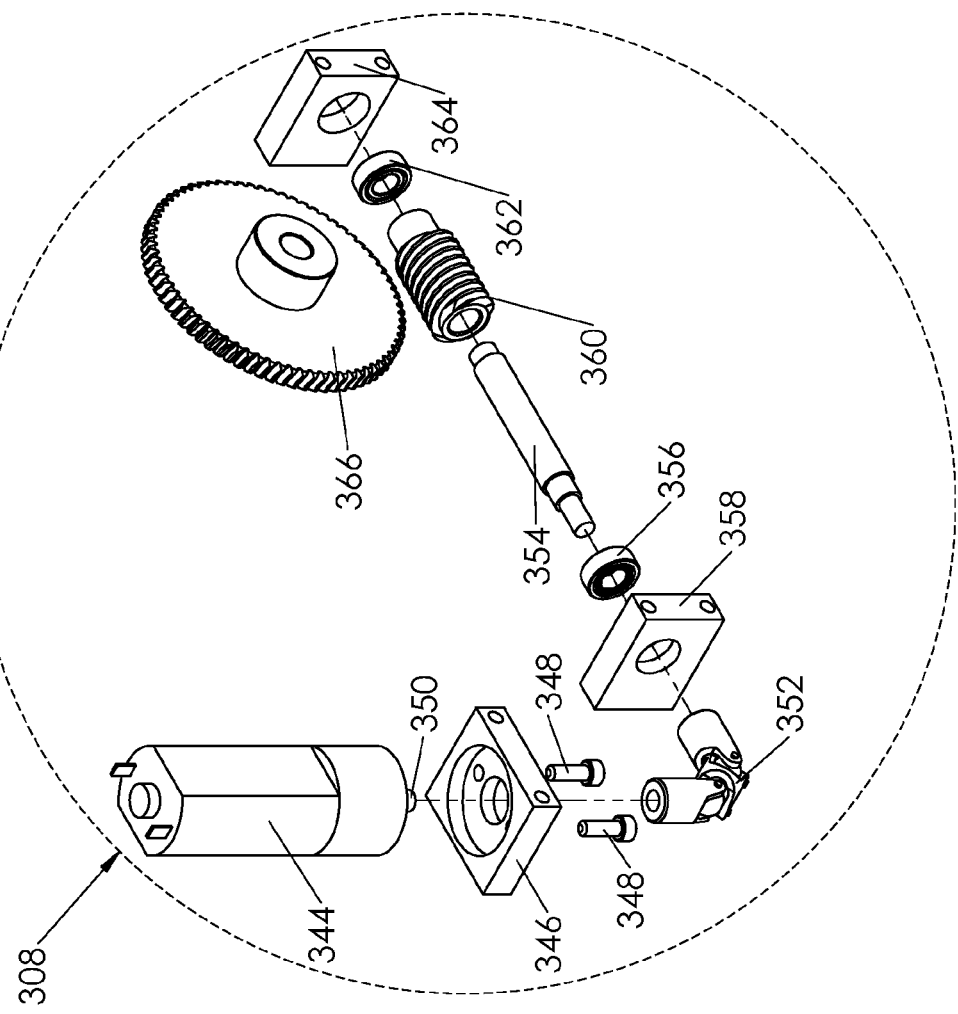

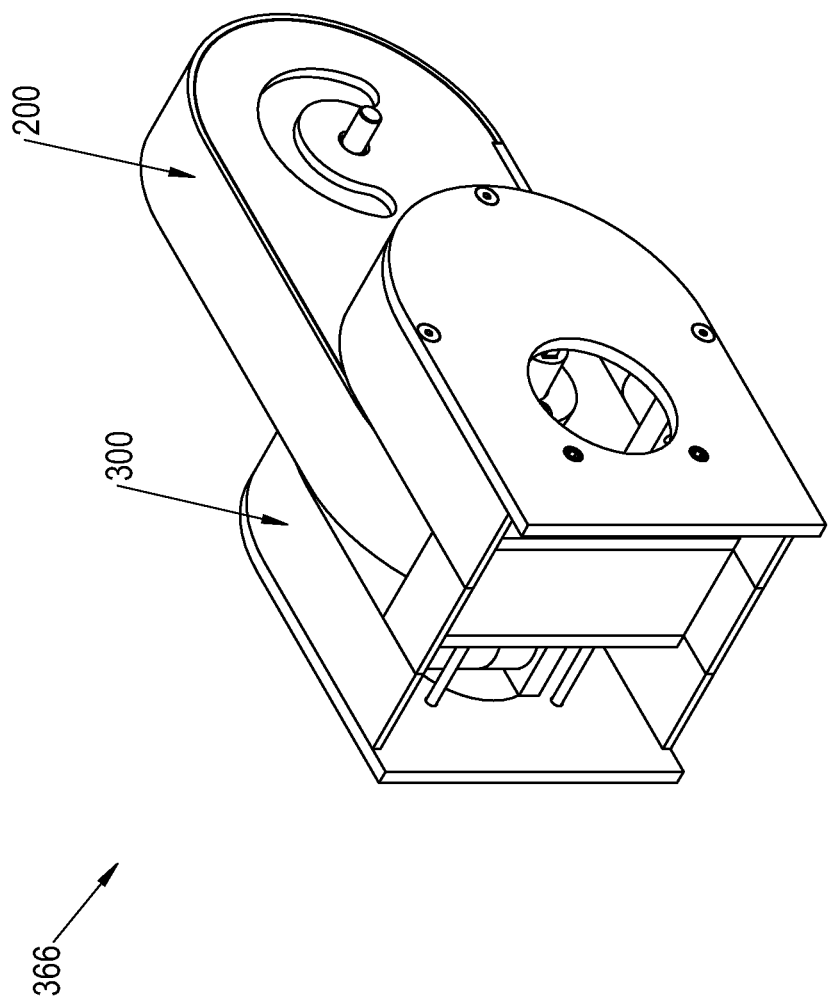

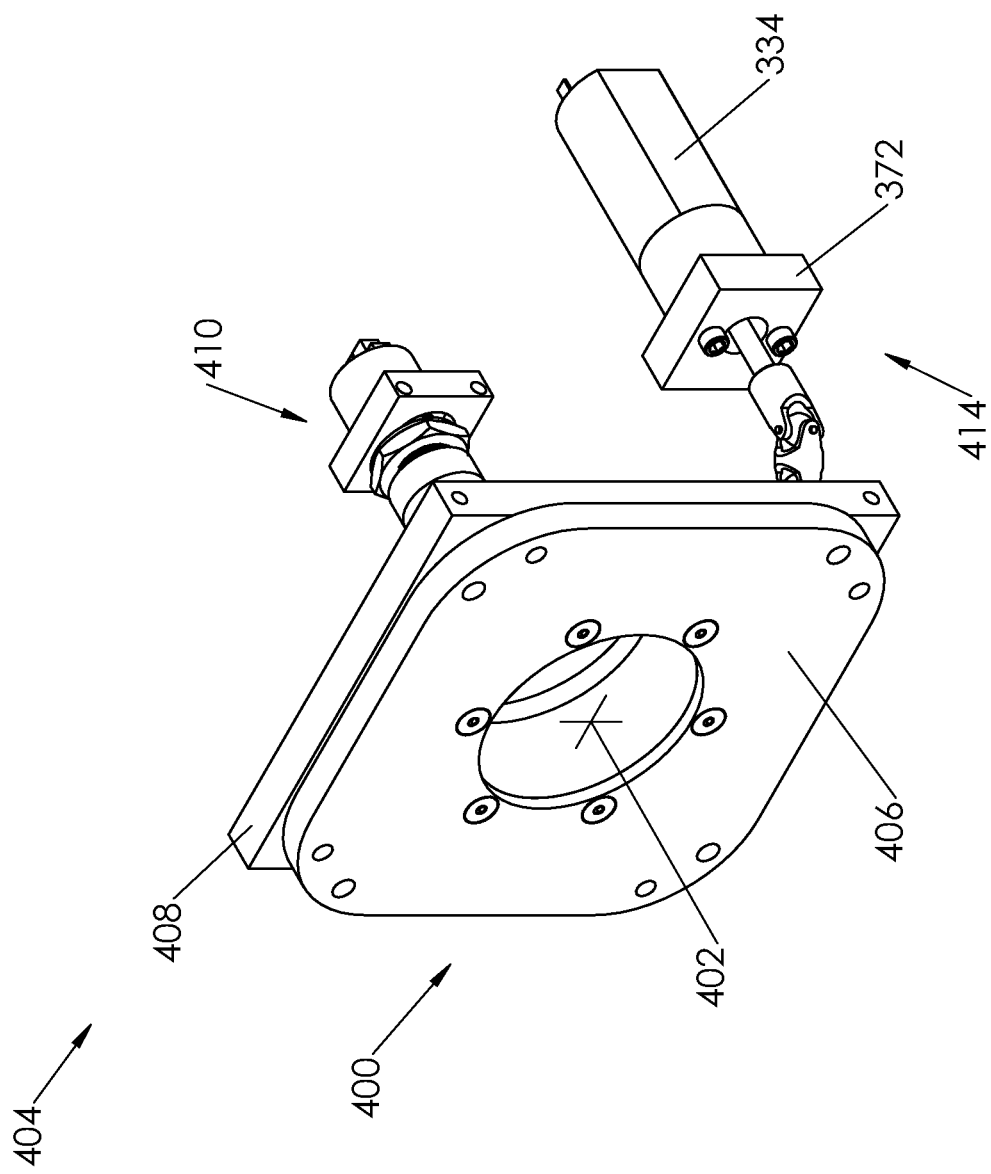

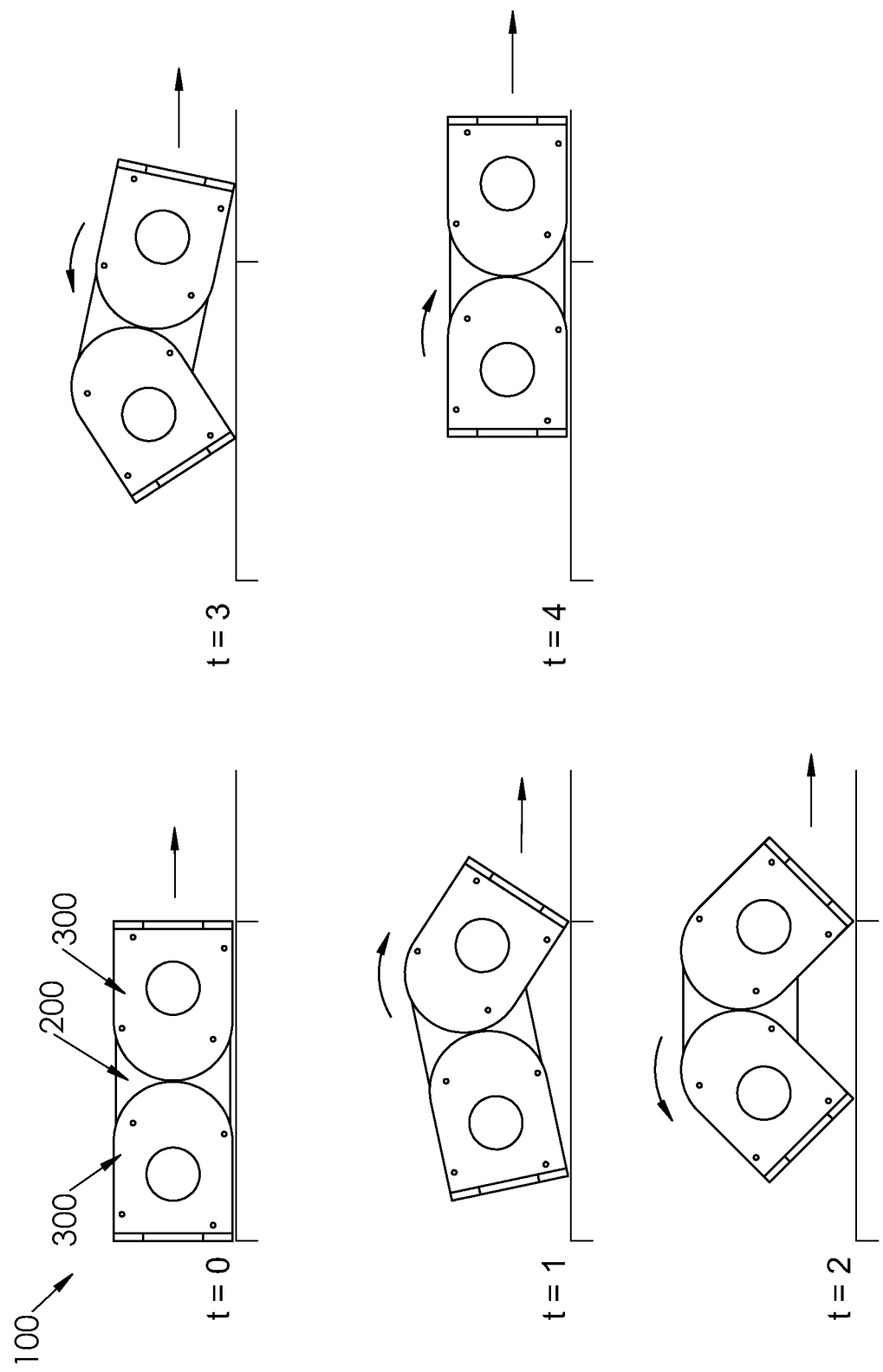

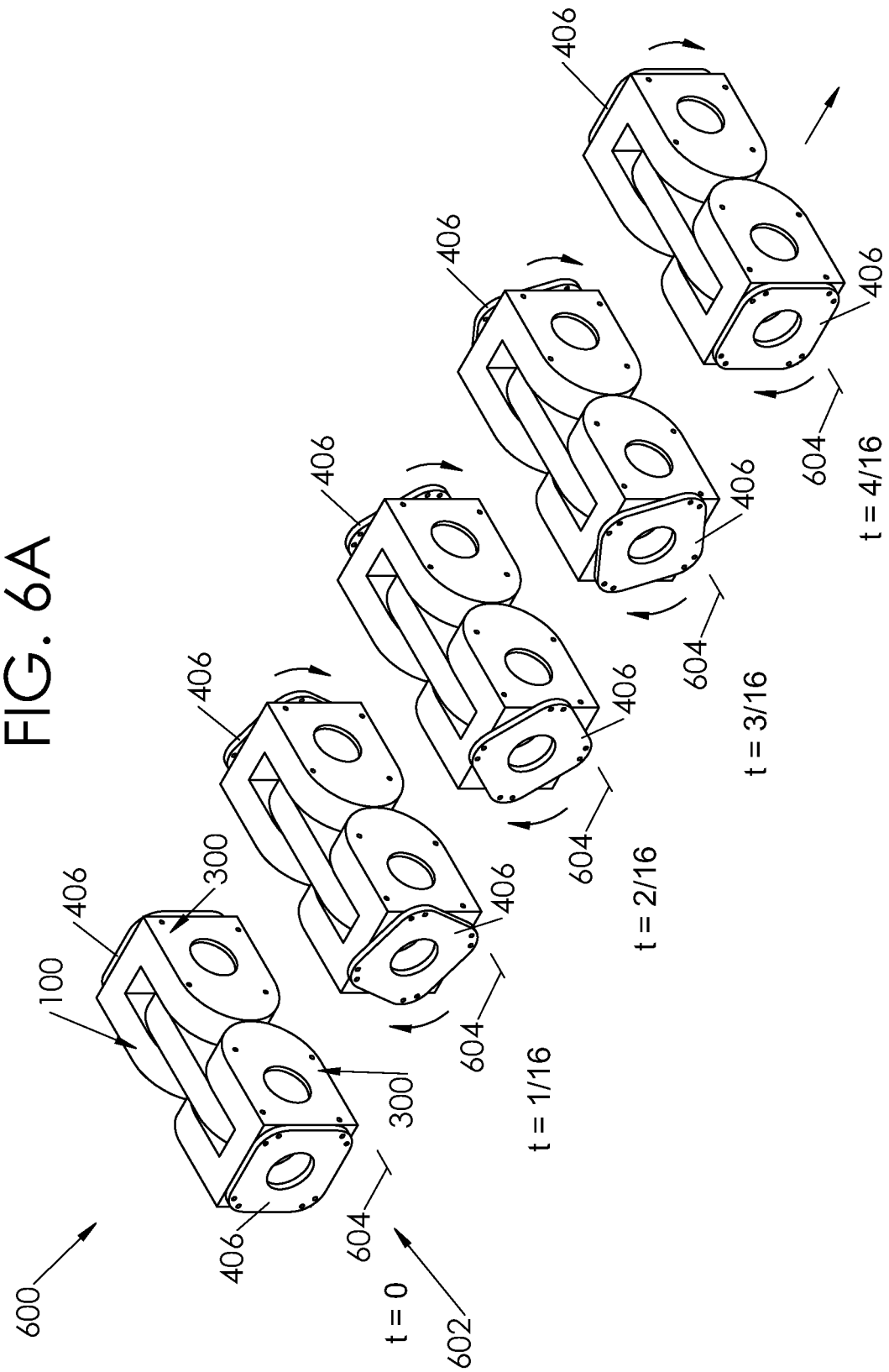

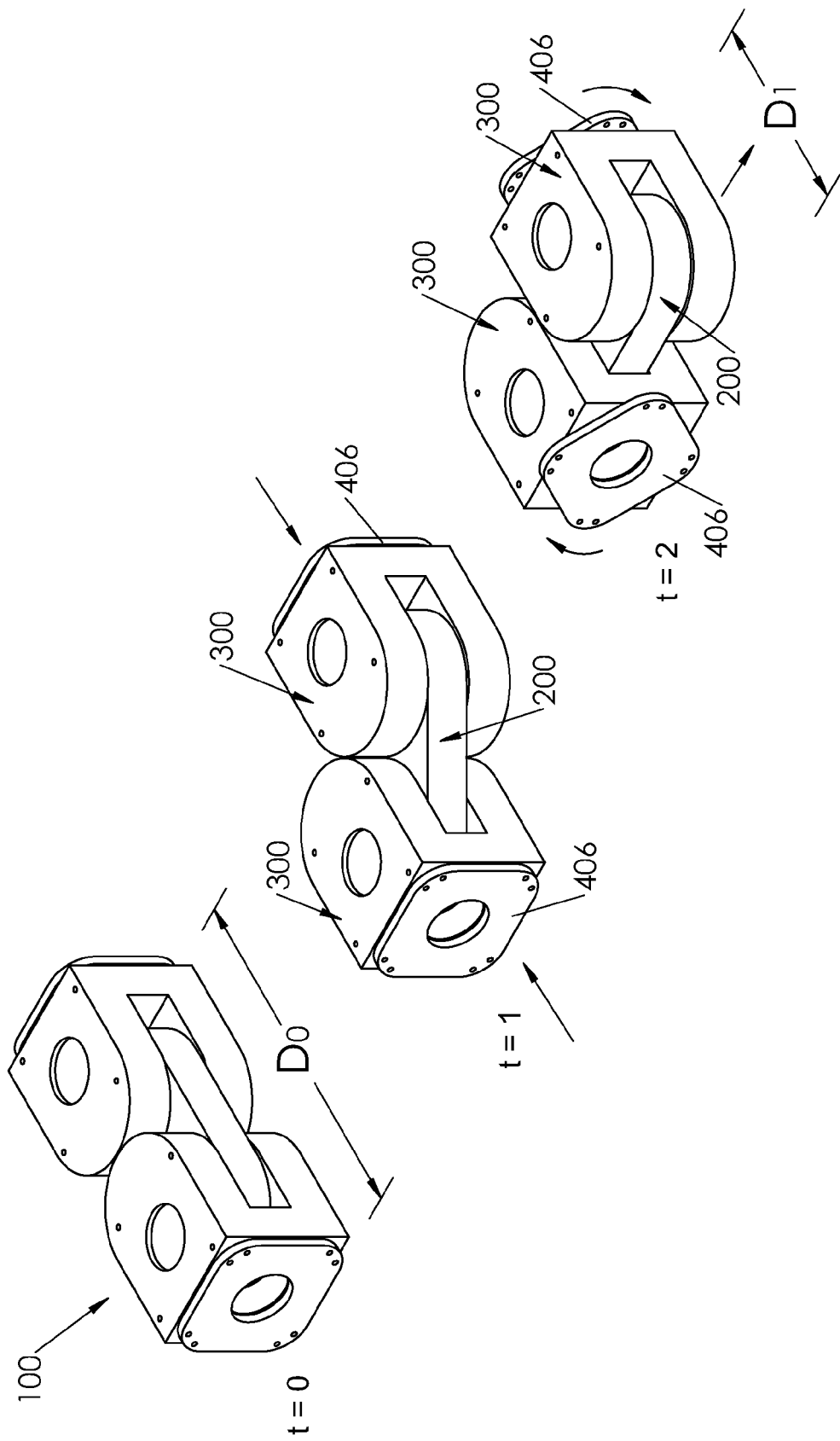

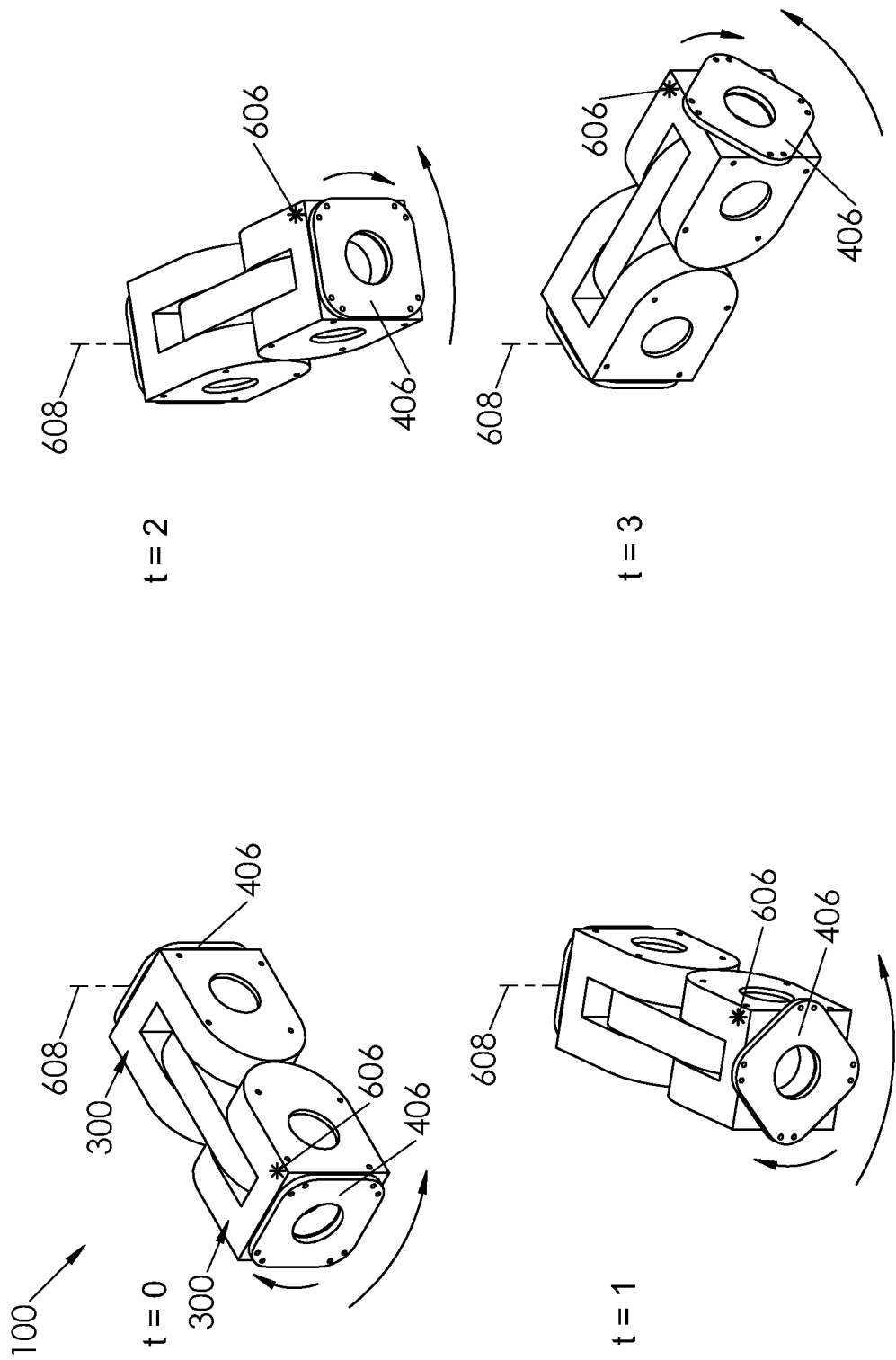

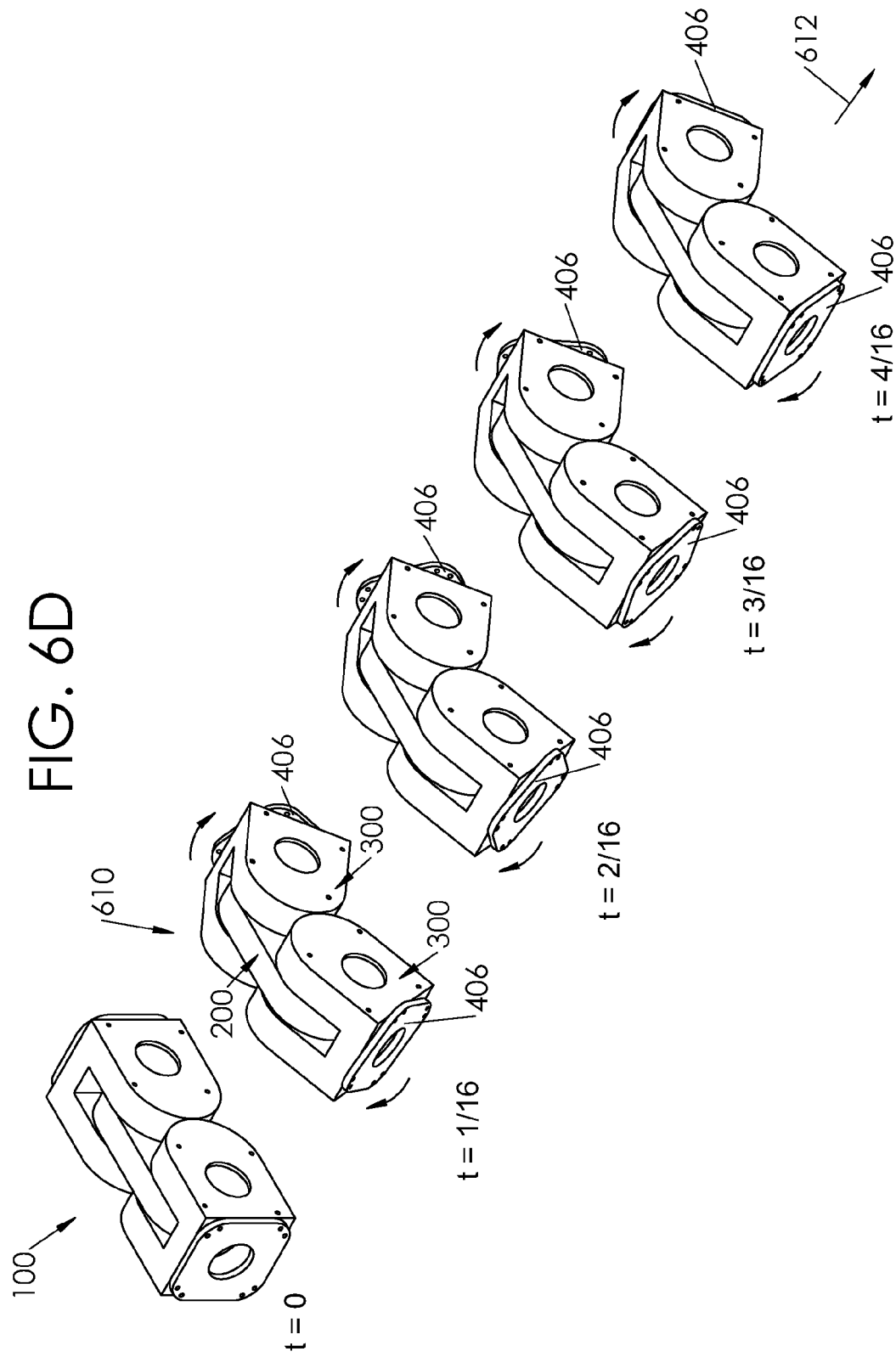

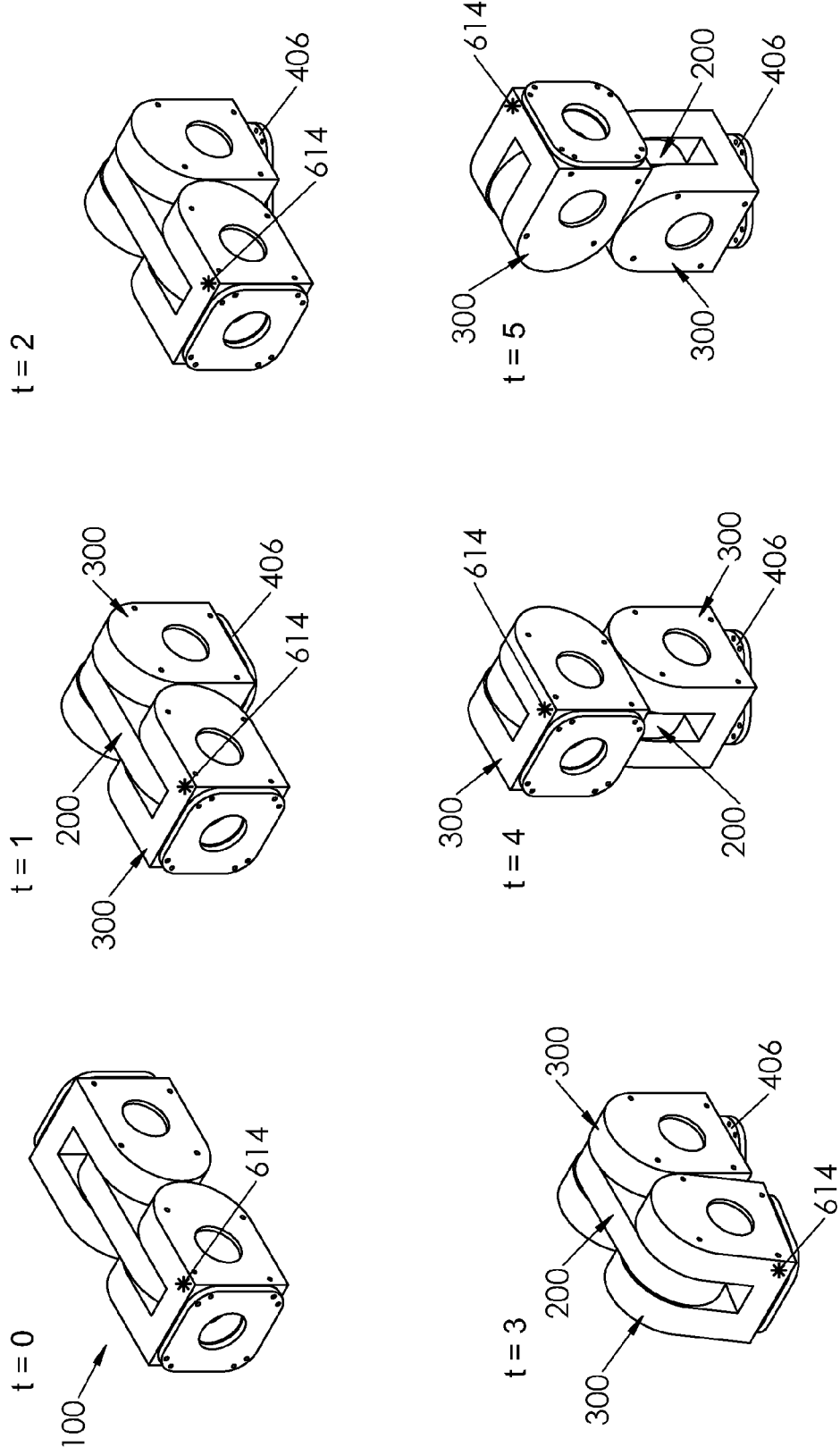

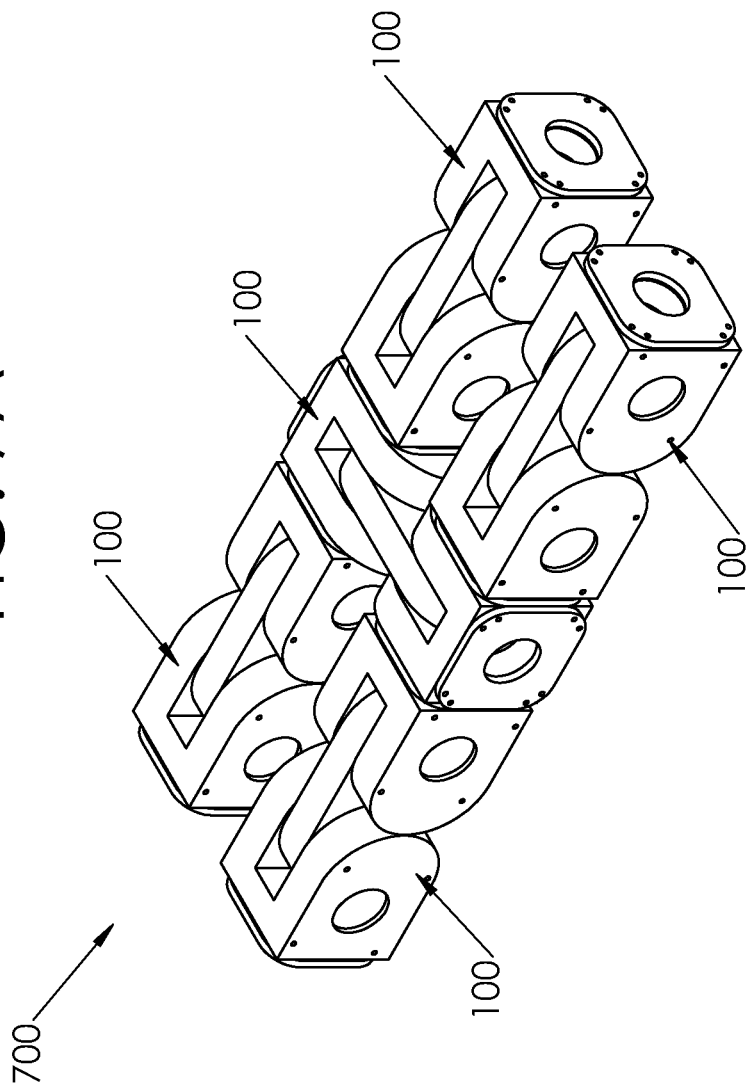

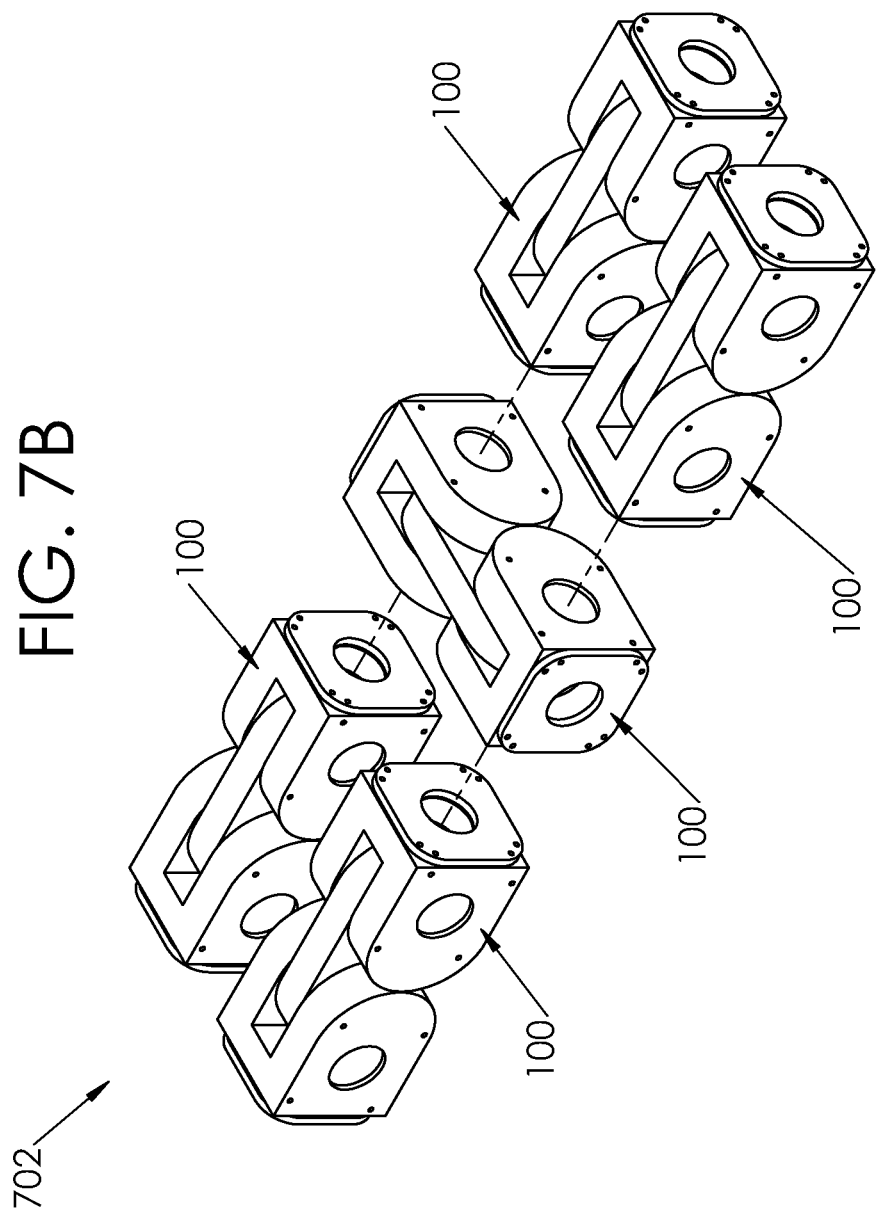

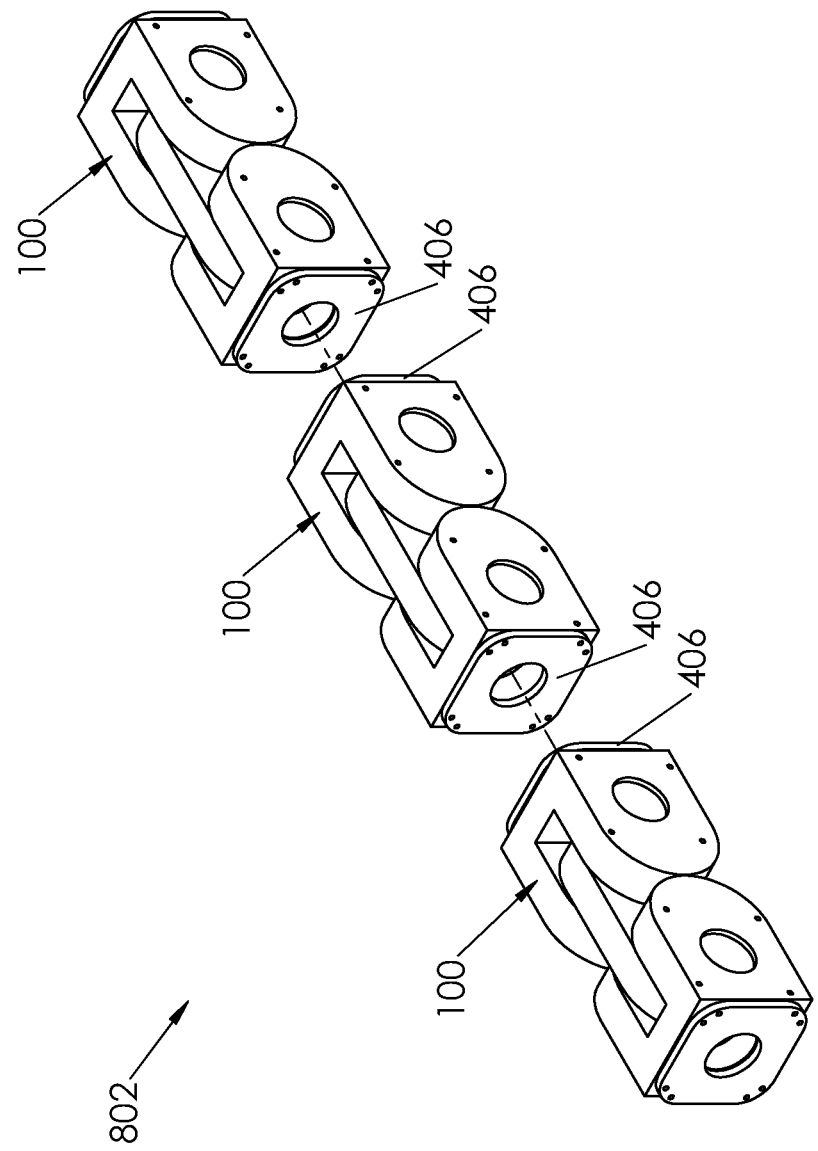

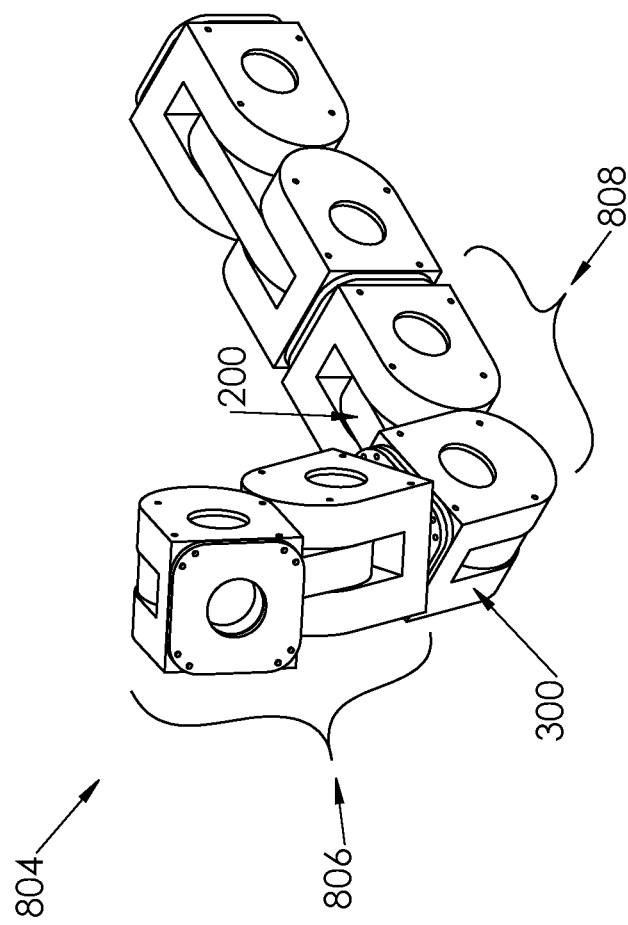

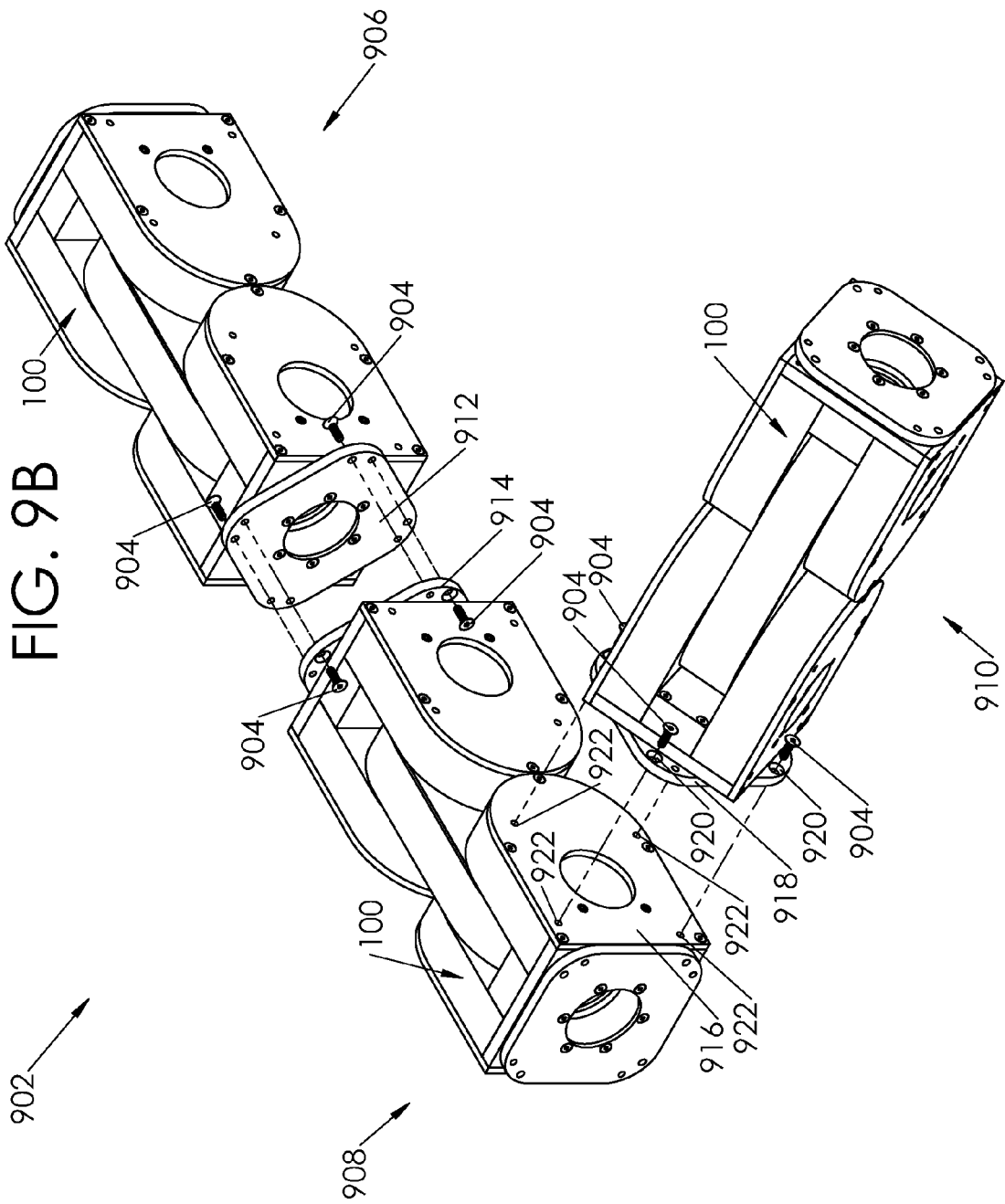

FOUR DEGREE OF FREEDOM (4-DOF) SINGLE MODULAR ROBOT UNIT OR JOINT

CROSS-REFERENCE TO RELATED APPLICATIONS

This application a 35 U.S.C. §111(a) continuation of PCT international application number PCT/US2011/023776 filed on Feb. 4, 2011, incorporated herein by reference in its entirety, which is a nonprovisional of U.S. provisional patent application Ser. No. 61/302,010 filed on Feb. 5, 2010, incorporated herein by reference in its entirety. Priority is claimed to each of the foregoing applications.

The above-referenced PCT international application was published as PCT International Publication No. WO 2011/097502 on Aug. 11, 2011 and republished on Dec. 29, 2011, and is incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to robotics and more particularly to modular robotics.

2. Description of Related Art

Traditional robotic systems tend to be specialty devices, each different from the next. Typically, there is little commonality between the components of robots, leading to high part count and programming complexities.

BRIEF SUMMARY OF THE INVENTION

An aspect of the invention is a module, comprising: a center link; an outer link pivotably connected to the center link; and a faceplate rotationally connected to the outer link. The faceplate may rotate about the outer link about a faceplate rotation axis. The outer link may be pivotably connected to the center link through a pivot shaft disposed between the outer link and the center link. The pivot shaft has a pivot axis about which the center link may pivot relative to the outer link.

The above module may comprise: a faceplate assembly comprising: a frame connected to the outer link; and the faceplate rotationally connected to the frame, wherein the faceplate rotates about the outer link about a faceplate rotation axis.

In the module above, one of the center links may be pivotably connected to two of the outer links. The outer links may be pivotably connected to the center link through two pivot shafts.

A modular robot unit may comprise at least two outer links interconnected by their respective faceplates, and the two outer links may be interconnected through a connector.

In the module above, a modular robot unit may comprise at least two outer links pivotably connected to one center link. Here, the at least two outer links may be pivotably connected to the one center link through two pivot shafts.

In the module above, the outer link may pivotably connect to the center link about a pivot axis; the faceplate may rotationally connect to the outer link about a rotation axis; and the pivot axis and the rotation axis may be either linearly independent, or substantially orthogonal. The module may also be a single modular robot unit.

In the module above, the faceplate may be continuously rotatable. Further, the faceplate may comprise an aperture wherein signals may pass. The signals may be selected from one or more of the group consisting of: control, communications, power, audio, video, tactile feedback, haptic feedback, sensor, digital, and analog.

In the module above, the outer link may comprise a faceplate motor able to rotate the faceplate. Here, the outer link may comprise: a center link pivot disposed within the outer link; wherein the center link pivot is able to pivot the center link relative to the outer link.

The module above may further comprise a battery disposed within the center link; wherein the battery provides power for the faceplate motor and the center link pivot.

In the module above, the faceplate may rotatably connect to the outer link through a frame connected to the outer link through a rotatable connection, the rotatable connection comprising: a cylindrical thrust bearing disposed between the frame and the faceplate; a landed recess disposed on the frame; a radial bearing disposed at least partially within the landed recess; a hub attached to the faceplate that sequentially passes through the radial bearing, the frame, the cylindrical thrust bearing, and then attaches to the faceplate; and an encoder drive gear and a worm gear attached to the hub; wherein a rotation of the drive gear results in a corresponding rotation of the faceplate relative to the frame.

Another aspect of the invention, a four degree-of-freedom (4-DOF) robot module may comprise: a center link; two outer links pivotably connected to the center link through two pivots; a faceplate encoder assembly, mounted to each outer link that detects rotation of the faceplate; a pivot axis, through which the center link pivots relative to each outer link; and a faceplate assembly, comprising: a frame connected to each outer link; a rotatable connection that rotatably connects each of the outer links through the frame to a faceplate; wherein each faceplate rotates about a faceplate rotation axis substantially orthogonal to the pivot axis of the outer link to which it is mounted; wherein the two center link pivots and the two faceplate rotations form a four degree-of-freedom (4-DOF) single modular robot unit. Here, each faceplate may comprise a radiused substantially square plate.

In the aspect above, a rotation of the faceplate may produce motion in the 4-DOF single modular robot unit. Additionally, a wheel may be attached to and rotated by the faceplate.

In still another aspect of the invention is a method of articulating a module, comprising; providing a module comprising: a center link; two outer links pivotably attached to the center link; and a faceplate rotationally attached to each outer link; pivoting one or both outer links relative to the center link; and rotating one or both faceplates.

Driving the module in a substantially straight line may be accomplished by rotating the faceplates at the same rate, in the same direction.

By the same direction, it is meant that the faceplates are rotated in such a way that the module "drives" in the direction of rotation. This "driving" is instead of spinning about, which would occur should the faceplates be rotated in opposite directions.

Driving the module in a curve may be accomplished by rotating the faceplates at different rates, but in the same direction.

"Turning on a dime" or turning the module substantially inside its overall length may be accomplished by rotating the faceplates at the same rate, but in opposite directions.

These same and opposite rotations are relative to the outer links to which the faceplate is attached.

The module may be a component of an assembly of two or more modules. This allows for very high numbers of degrees of freedom in the resulting assembly.

In yet another aspect of the invention is a module comprising: two outer links; and means for articulating the two outer links.

The means for articulating comprises: a center link pivotably connected to each outer link; and a faceplate rotationally connected to each outer link. The combination of the center link pivotably connected to each of two outer links, and faceplate rotation of each of the outer links, results in a composite four degree-of-freedom (4-DOF) module. By mounting two or more such modules, an assembly of modules may be created. The resulting assemblies would have 4-DOF per module. The module may also comprise a single modular robot unit.

In still another aspect of the invention is a module, comprising: a center link; two outer links; and means for independently articulating the center link pivotably connected to each outer link, to create two degrees of freedom (2-DOF); and means for rotating a faceplate relative to each outer link, to create two more degrees of freedom (2-DOF); wherein the means for independently articulating and the means for rotating create a module with a total of four degrees of freedom (4-DOF). The two outer links may be substantially identical.

A single modular robot unit may be comprised of the above module.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWINGS

The invention will be more fully understood by reference to the following drawings FIG. 1A through FIG. 9B, which are for illustrative purposes only:

FIG. 1A is a perspective view of a single modular robot unit.

FIG. 1B is a perspective exploded view of the single modular robot unit of FIG. 1A, showing its separate components comprising the center link, two outer links, and the visible components of the faceplate assemblies.

FIG. 1C is a proposed perspective view of an alternative assembly of the outer links and center links of FIG. 1A, where a connector mechanically links two faceplate assemblies together.

FIG. 2A is a perspective view of the center link.

FIG. 3D is an exploded view of the center link pivot, which operates to actuate and pivot the center link previously shown of FIG. 3B, relative to the outer link.

FIG. 3E is a perspective view of the assembled center link and outer link.

FIG. 4A is a perspective view of an assembled faceplate assembly with an aperture for passage of electrical signals, also showing the faceplate drive assembly.

FIG. 5 is a perspective view of a series of still frames showing an "inch worm" motion used by the single modular robot unit of FIG. 1A for crawling.

FIG. 6A is a sequence of perspective views that illustrate the driving operating mode accomplished by continuously rotating the faceplates (in the same direction) on the single modular robot unit of FIG. 1A.

FIG. 6B is a perspective view of how to articulate the single modular robot unit of FIG. 1A into a minimum width configuration.

FIG. 6C is a perspective view of how the single modular robot unit of FIG. 1A may be made to pivot about an axis at one end.

FIG. 6D is a perspective view of a sequence of arching and driving the single modular robot unit of FIG. 1A.

FIG. 6E is a perspective view of a sequence of motions undertaken by the single modular robot unit of FIG. 1A called the "camera view" motion.

FIG. 7A is a perspective view of a cluster of five assembled single modular robot units of FIG. 1A.

FIG. 7B is a partially exploded perspective view of the five assembled single modular robot units of FIG. 7A.

FIG. 8B is a partially exploded perspective view of the cluster of three single modular robot units linked faceplates to faceplates of FIG. 8A.

FIG. 8C is a perspective view of an articulation of the "snake" configuration of FIG. 8A, which may be used for elevated viewing.

FIG. 9B is a partially exploded perspective view of the cluster of three single modular robot units linked in the "L" configuration of FIG. 9A.

DETAILED DESCRIPTION OF THE INVENTION

Introduction

Figure 2B:
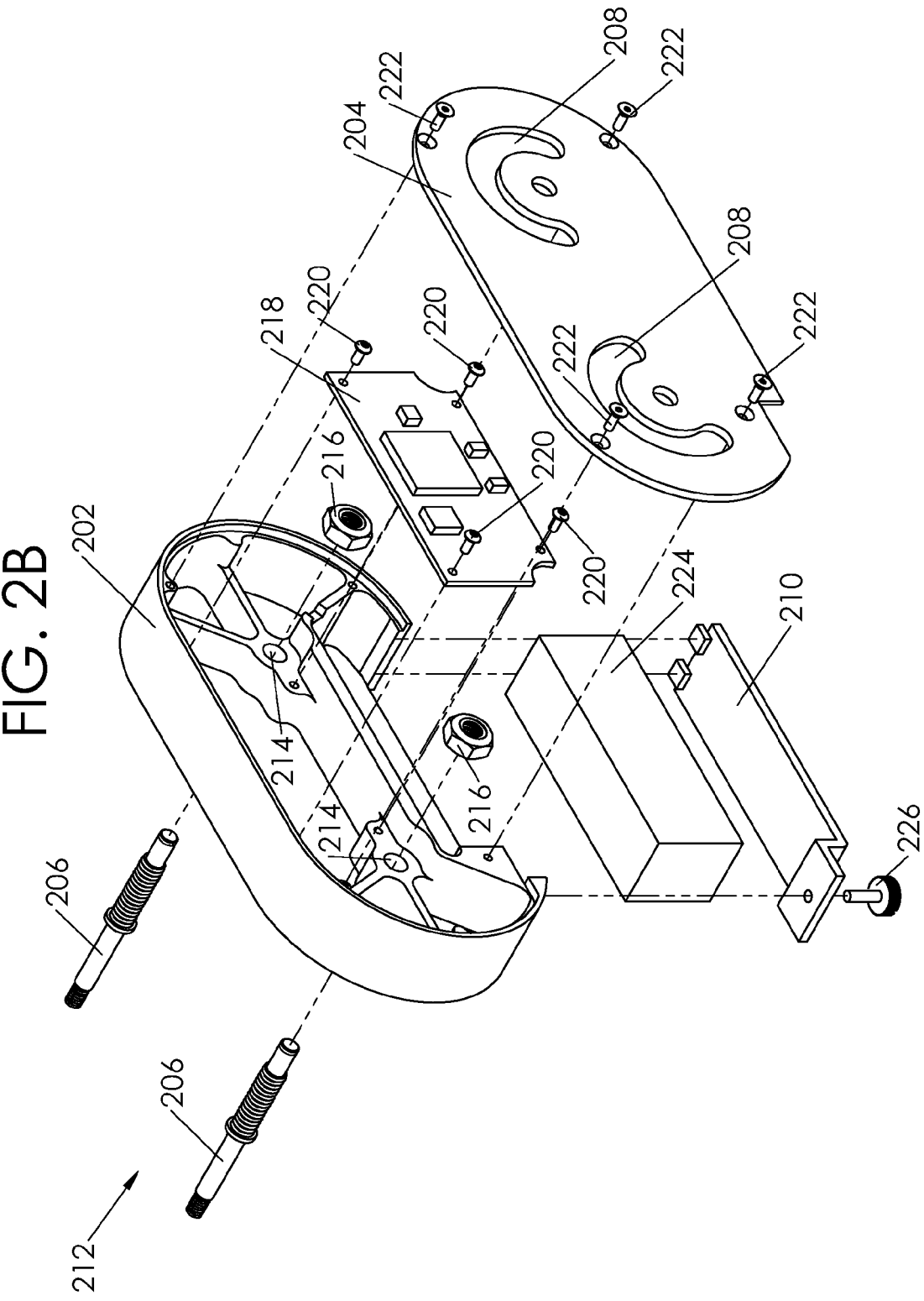
FIG. 2B is an exploded perspective view of the center link of FIG. 2A.

A novel reconfigurable modular robot has been designed. Each individual module incorporates up to four controllable degrees of freedom made up of a center section, two outer sections, and rotating faceplates at the ends of each outer section. The outer sections are attached to the center section and can rotate 180 degrees, which enables the robot to crawl like an inchworm. The outer faceplates can rotate continuously, which enables the robot to drive as though with wheels. This significantly increases the mobility of the module, allowing it to traverse a wide variety of terrain without an overcomplicated physical shape. Each module typically has six mounting locations for other modules or accessories to attach, two on each side and one at each end.

Refer now to FIG. 1A, which is a perspective view of a single modular robot unit 100. The single modular robot unit 100 comprises one center link 200, and two outer links 300. Each outer link 300 has an aperture 302 for passage of various electrical signals. Attached to each outer link 300 is a faceplate assembly 400, also having an aperture 402 for passage of various electrical signals. Each of the center link 200, outer links 300, and faceplate assemblies 400 will be described further below.

Refer now to FIG. 1B, which is a perspective exploded view 102 of the single modular robot unit 100 of FIG. 1A, again showing its separate components comprising the center link 200, two outer links 300, and the visible components of the faceplate assemblies 400. In this FIG. 1B, the faceplate assembly 400 is shown simply as a quasi-square piece. In reality, the construction of the faceplate assembly 400 is shown in much more detail later.

Refer now to FIG. 1C, which would be a perspective view of an alternative assembly 104 of the outer links 300 and center links 200 previously shown in FIG. 1A, where a connector 106 mechanically links two faceplate assemblies 400. As both faceplate assemblies 400 are rotational in nature, one of these could be removed. However removal of a faceplate assembly 400 would no longer make the resultant modular robot unit identical to the single modular robot unit 100 of FIG. 1A, which would defeat the purpose of using a modular robot design. Additionally, either or both of the center links 200 may be removed, however again at the expense of no longer having identical single modular units 100.

Refer now to FIG. 2A, which is a perspective view of the center link 200. A center link 200 housing 202 provides a base for mounting the other components of the center link 200. However, in this view, only the lid 204, two pivot shafts 206, two feed through apertures 208, and the battery cover 210 are visible. The feed through apertures 208 are slotted circular segment sections that permit passage of wires and other electrical connections between the interior of the center link 200 and the outer link 300 (not shown here).

Refer now to FIG. 2B, which is an exploded perspective view 212 of the center link 200 of FIG. 2A. Here, the housing 202 has two pivot shafts 206 that pass through the housing 202 shaft bores 214, to be secured by shaft nuts 216. It should be noted here that the pivot shafts 206 do not rotate relative to the center link 200, and are instead stationary.

A center link 200 printed circuit board 218 is secured by screws 220 into the housing 202. The printed circuit board 218 provides control of communications, power, audio, video, tactile feedback, haptic feedback, and sensor, digital, and analog for the single modular robot 100 of FIG. 1A. A center link 200 lid 204 is secured by one or more screws 222 onto the housing 202. A battery pack 224 is slid into a recess formed by the housing 202 and lid 204, and secured by the battery cover 210, which in turn is secured by a thumb screw 226. The battery pack 224 provides power to the printed circuit board 218 through wires or other connections (not shown). Additionally, the battery pack 224 provides power to the outer links 300 (not shown here) through connections passing through the apertures 208. After assembly is completed, the center link 200 resembles that shown previously in FIG. 2A.

Figure 3A:
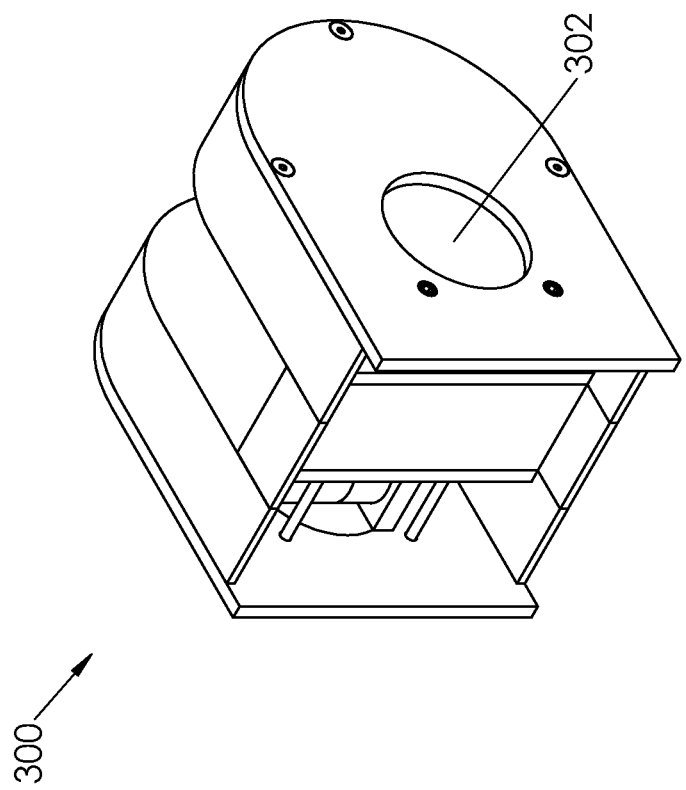
FIG. 3A is a perspective view of an outer link with the visible components of the faceplate assembly (previously shown in FIG. 1A) removed.

Refer now to FIG. 3A, which is a perspective view of an outer link 300 with the visible components of the faceplate assembly 400 (previously shown in FIG. 1A) removed. Here, the outer link 300 has an aperture 302 for passage of various electrical signals.

Figure 3B:
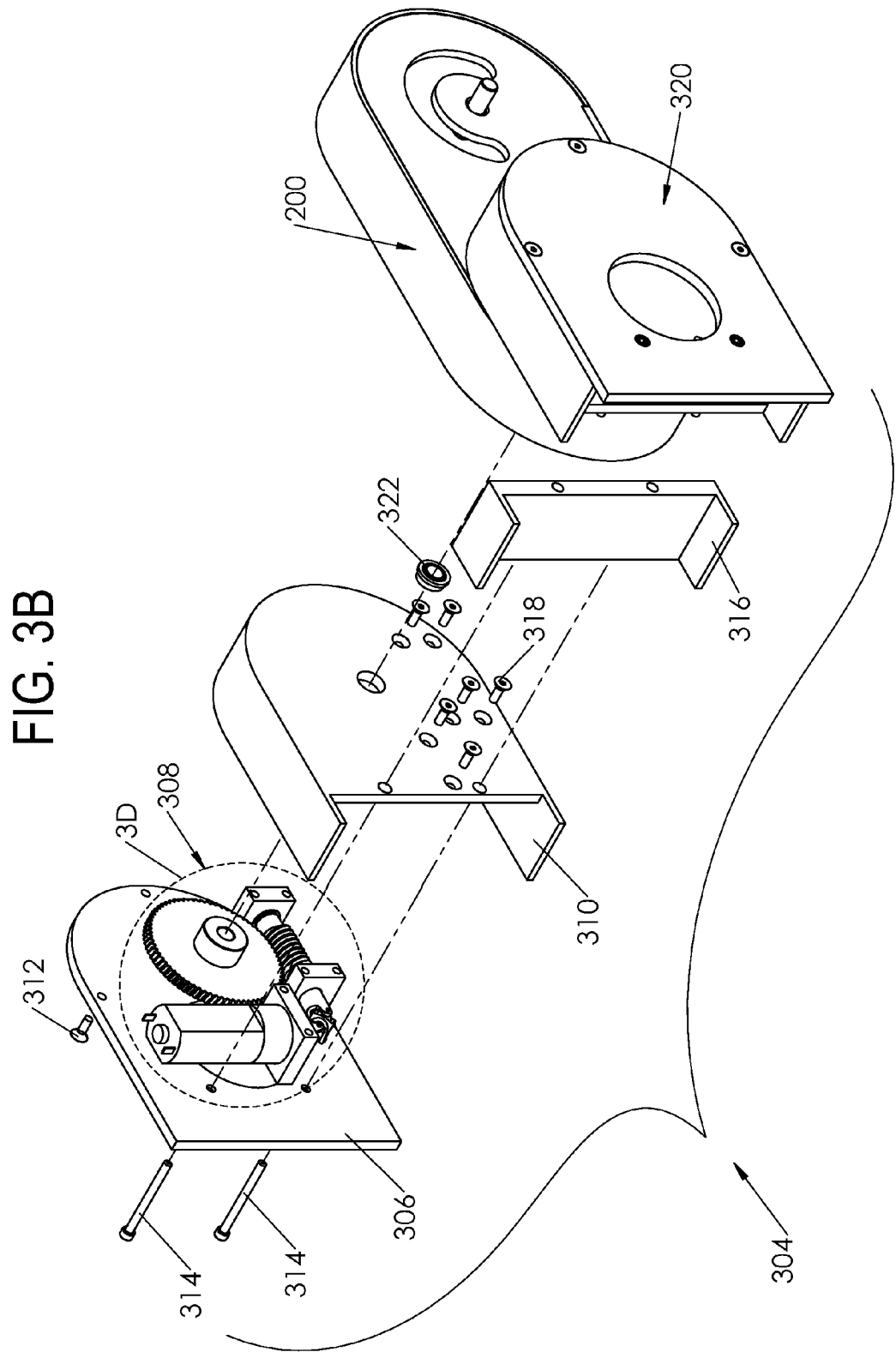
FIG. 3B is a partially exploded perspective view of the outer link previously shown in FIG. 1A.

Refer now to FIG. 3B, which is a partially exploded perspective view 304 of the outer link 300 previously shown in FIG. 1A. Assembly progresses from a side cover 306 to which a center link pivot 308 is already attached. An outer section body 310 attaches to the side cover 306 with side cover screws 312 and outer section body screws 314 that pass through the outer section body 310 to a central mounting bracket 316. Additional motor and bearing block screws 318 secure the outer section body 310 to the center link pivot 308. Notably, a bearing 322 interconnects the center link 200 to the center link pivot 308. The remainder of the already assembled center link 200 and encoder section 320 are shown to indicate the context of the overall outer link 300 assembly.

Figure 3C:
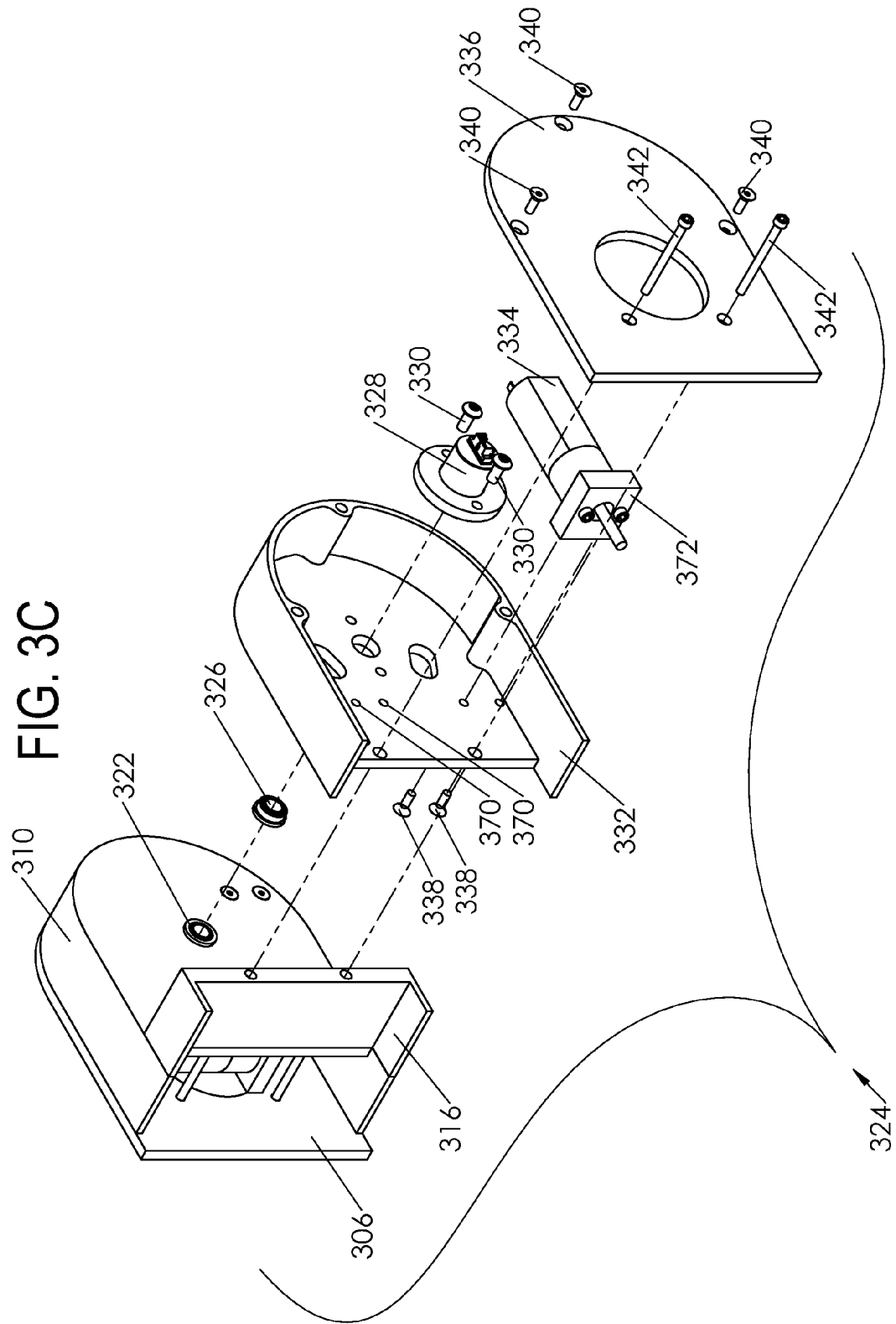
FIG. 3C is a partially exploded perspective view showing the assembly of the encoder side of the outer link.

Refer now to FIG. 3C, which is an exploded perspective view 324 showing the assembly of the encoder side of the outer link 300. Here, the outer section body 310 has been assembled to the side cover 306 and the central mounting bracket 316. Bearing 322 has been assembled into the outer section body 310, and encoder bearing 326 is now shown. An encoder 328 is mounted via encoder mounting screws 330 into an encoder outer section body 332. Similarly, a faceplate motor 334 may be assembled either onto the encoder outer section body 332 or the encoder side cover 336. Here, the motor fasteners 338 are shown mounting the faceplate motor 334 to the encoder outer section body 332.

The encoder side cover 336 is mounted to the encoder outer section body 332 via encoder side cover screws 340 and encoder outer section body screws 342 that pass through the encoder outer section body 332 to the central mounting bracket 316.

Refer now to FIG. 3D, which is an exploded view of the center link pivot 308, which operates to actuate and pivot the center link 200, previously shown if FIG. 3B, relative to the outer link 300. Here, the center link pivot 308 drive train comprises a motor 344 that mounts to a motor block 346 with motor mounting screws 348. The motor 344 output shaft 350 is coupled to a universal joint 352 that connects to a shaft 354 that has passed through a shaft bearing 356 pressed into a bearing block 358. The shaft 354 in turn engages a worm 360 that is supported by a worm bearing 362 that resides in a worm bearing block 364. The worm 360 in turn drives a worm gear 366. When the worm gear 366 is attached (most likely but without limitation by a splined connection) to the center link 200 shaft 206 (previously shown in FIG. 2B), the center link 200 is pivoted relative to the outer link 300 through rotation of the motor 344.

Refer now to FIG. 3E, which is a perspective view 366 of the assembled center link 200 and outer link 300. Here, one may see the center link 200 assembled onto the outer link 300.

Figure 3F:
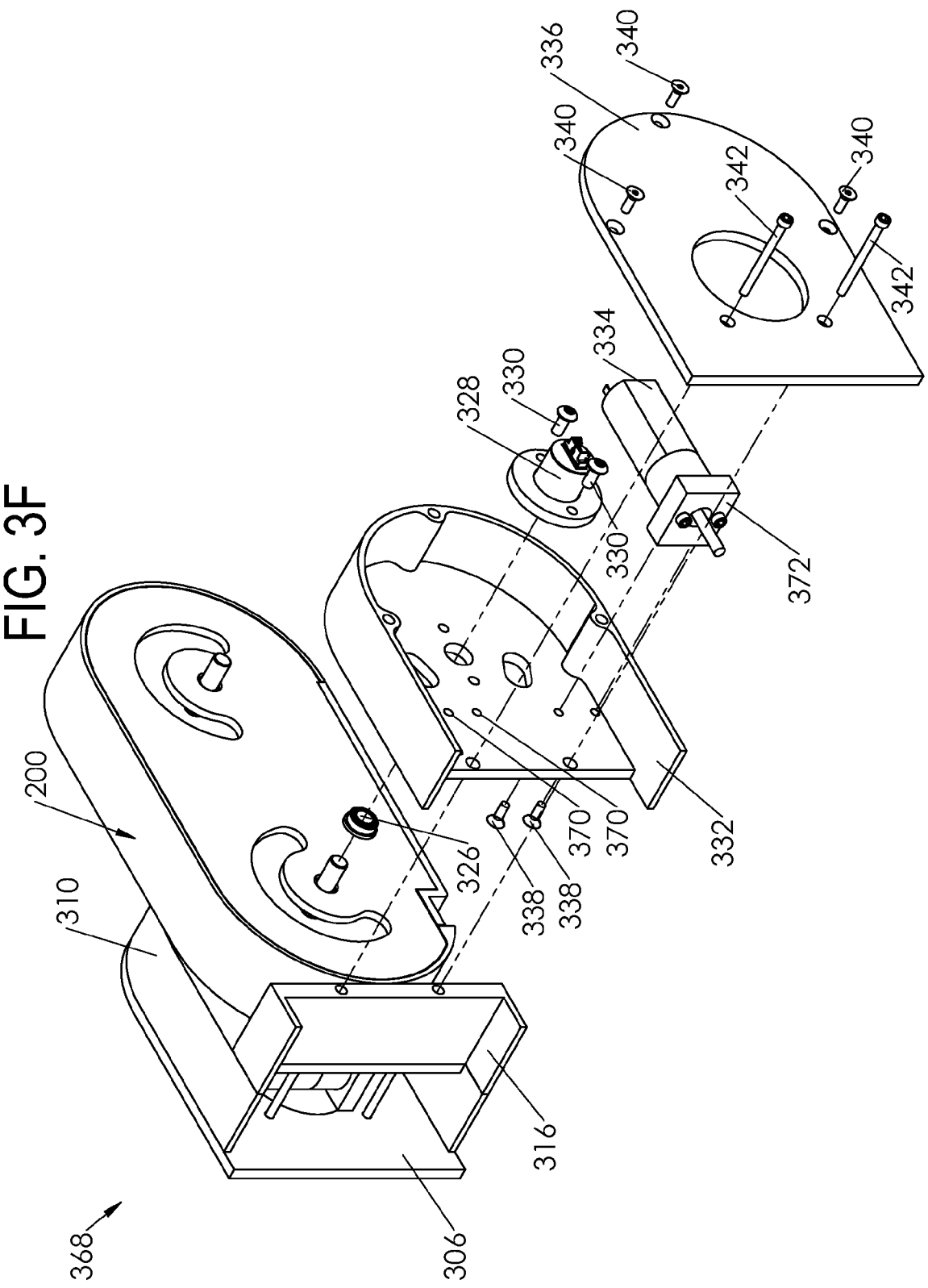
FIG. 3F is a partially exploded perspective view of the center link as it is assembled onto outer link.

Refer now to FIG. 3F, which is a partially exploded perspective view 368 of the center link 200 as it is assembled onto outer link 300. This is basically the same drawing as FIG. 3C, but with the center link 200 positioning shown. Mounting holes 370 provide mounting for a faceplate encoder assembly (not shown here to simplify understanding of the drawing) that will be discussed later.

It should be noted that the faceplate motor 334 is mounted by motor fasteners 338 passing through the encoder outer section body 332 to be secured into motor block 372.

Refer now to FIG. 4A, which shows an assembled faceplate assembly 400 with aperture 402 in a perspective view 404, also showing the faceplate drive assembly. Here the actual moving faceplate 406 is shown connected to a frame 408 driven by the faceplate motor 334 previously shown in FIG. 3C. A faceplate encoder assembly 410 is shown here, but will be described below.

Figure 4B:
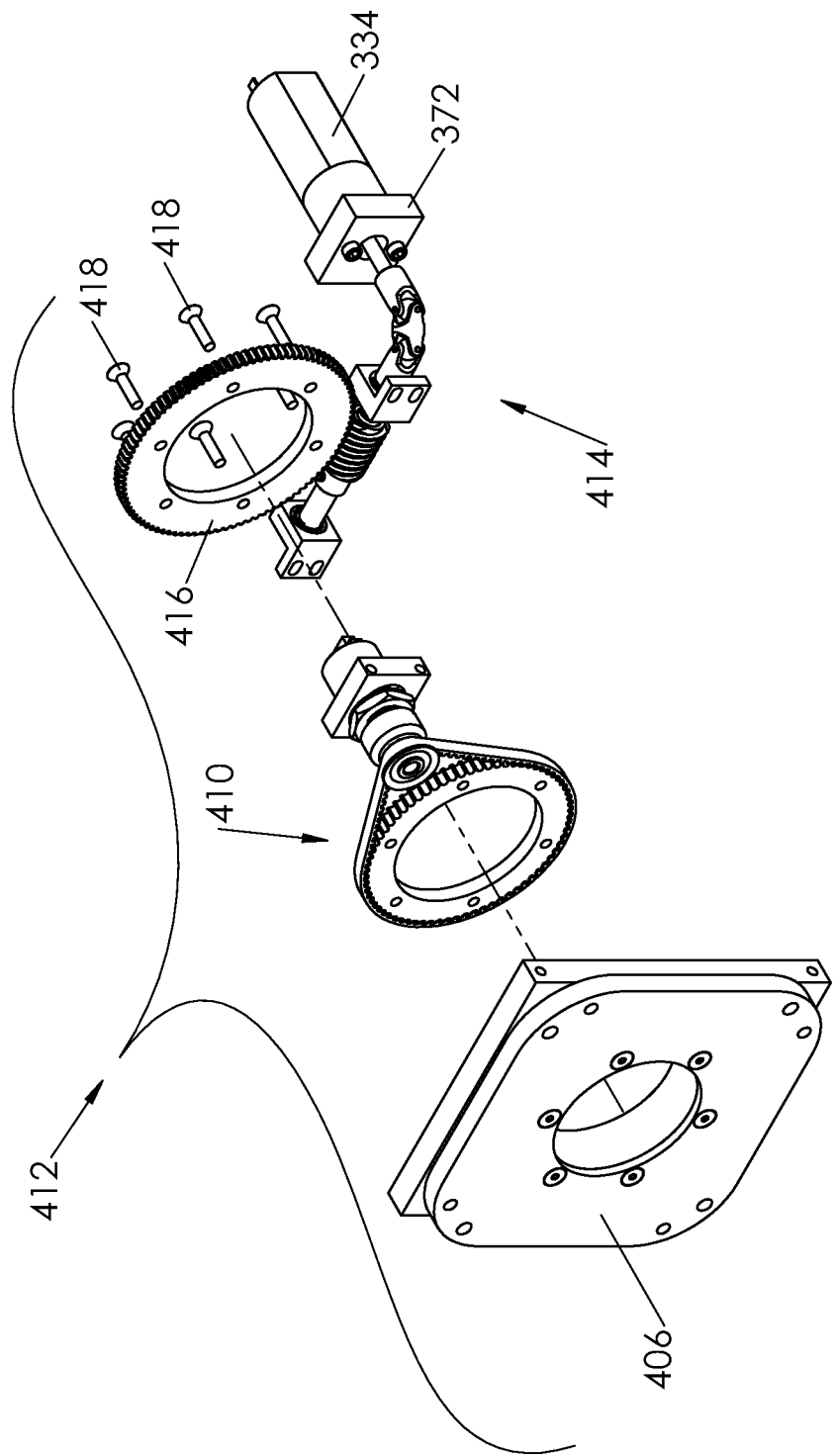
FIG. 4B is a partially exploded perspective view of the faceplate encoder assembly and the faceplate drive assembly attached to faceplate motor.

Refer now to FIG. 4B, which is a partially exploded perspective view 412 of the faceplate encoder assembly 410 and the faceplate drive assembly 414 attached to faceplate motor 334. A hub worm gear 416 is secured to faceplate 406 through hub screws 418.

Figure 4C:
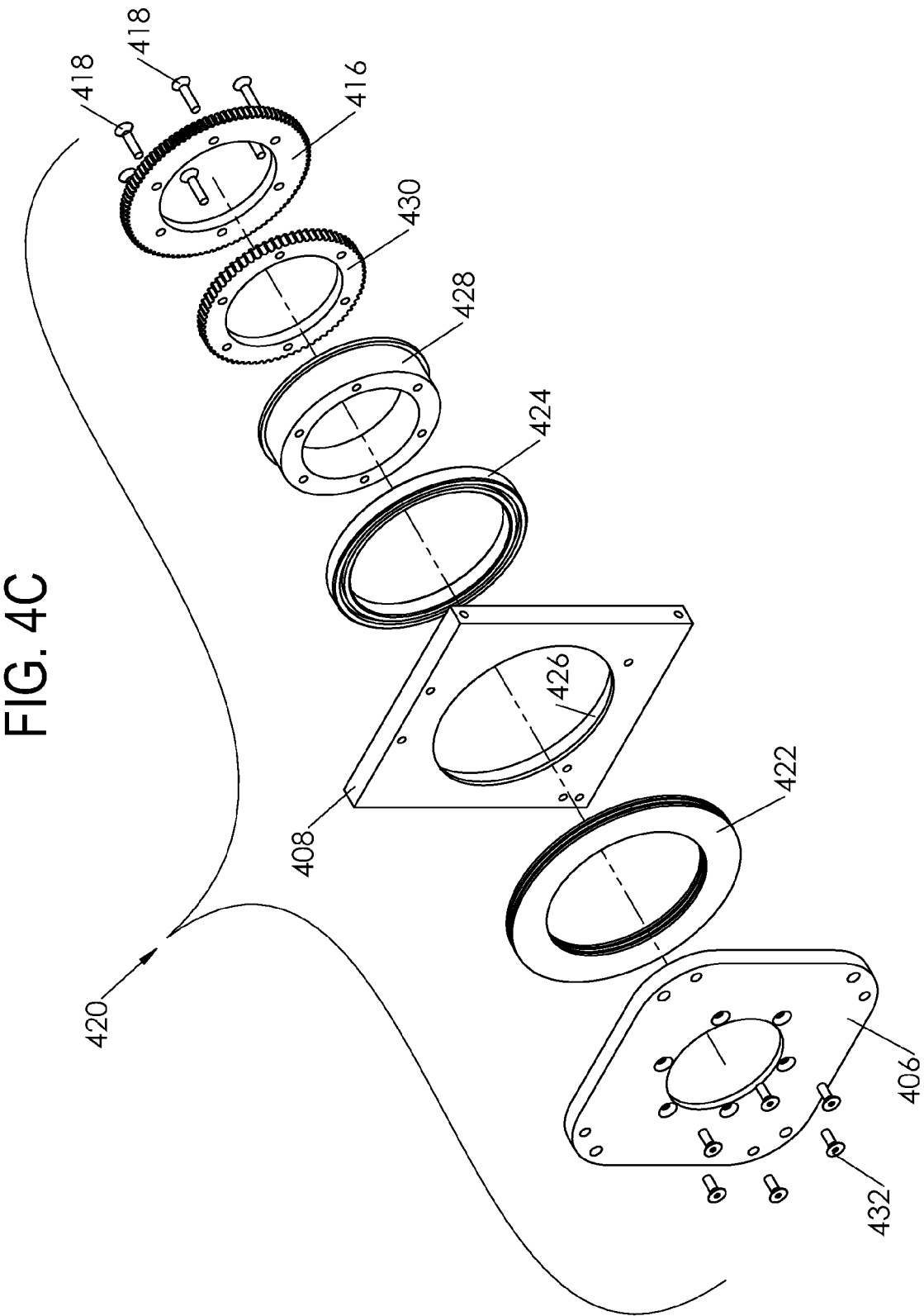
FIG. 4C is an exploded perspective view showing how the faceplate and frame are assembled and driven by a worm gear.

Refer now to FIG. 4C, which is an exploded perspective view of a rotatable connection 420 showing how the faceplate 406 and frame 408 are assembled, and driven by worm gear 416. Starting at the faceplate 406, a needle bearing 422 is a load bearing member against the frame 408 to provide a rotating bearing surface between the faceplate 406 and the frame 408, roughly operating like a Lazy Susan. On the other side of the frame 408, a radial bearing 424 is slid into a landed recess 426 in the frame 408. Next, a hub 428 is slid through the radial bearing 424 into contact with the faceplate 406. An encoder drive gear 430 is then placed adjacent to the hub 428. Next, the worm gear 416 is placed against the encoder drive gear 430. Hub screws 418 sequentially pass through the worm gear 416, the encoder drive gear 430, and threadedly engage the hub 428.

The hub 428, with the encoder drive gear 430 and worm gear 416 are then slid through the radial bearing 424, the frame 408, the needle bearing 422 to be secured onto the faceplate 406 by faceplate screws 432.

As assembled, a rotation of the worm gear 416 results in a corresponding rotation of the faceplate 406, independent of the frame 408.

The faceplate 406 design must rotate while under differing loads without binding. It's also important that it takes up as little thickness as possible. When the module is attached to other modules the faceplate is designed to have rotational, sheer, and thrust loads applied. Also, the various modules must communicate with each other, so a hollow hub must allow for line-of-sight optical communication or other electrical connection.

The faceplate bearing design is made up of two bearings, the needle bearing 422 (which operates as a thrust bearing), and the radial bearing 424 (a thin section bearing). The radial bearing 424 inserts into the back of the anchored frame 408 and the hub 428 (which is both hollow and made of aluminum) rotates inside it, connecting the worm gear 416 to the faceplate 406. The needle bearing 422 rotates between the faceplate 406 and frame 408. The radial bearing 424 acts axially when the faceplate rotates and as a thrust bushing when the faceplate 406 is pulled away from the frame 408 while rotating. The hub 428 bears against the radial bearing 424 when loaded perpendicular to its axis of rotation. The needle bearing 422 provides a smooth rotation when the faceplate 406 is pressed against the frame 408. The needle bearing 422 is located by the hub 428 that passes through the frame 408 and attaches to the faceplate 406.

Figure 4D:
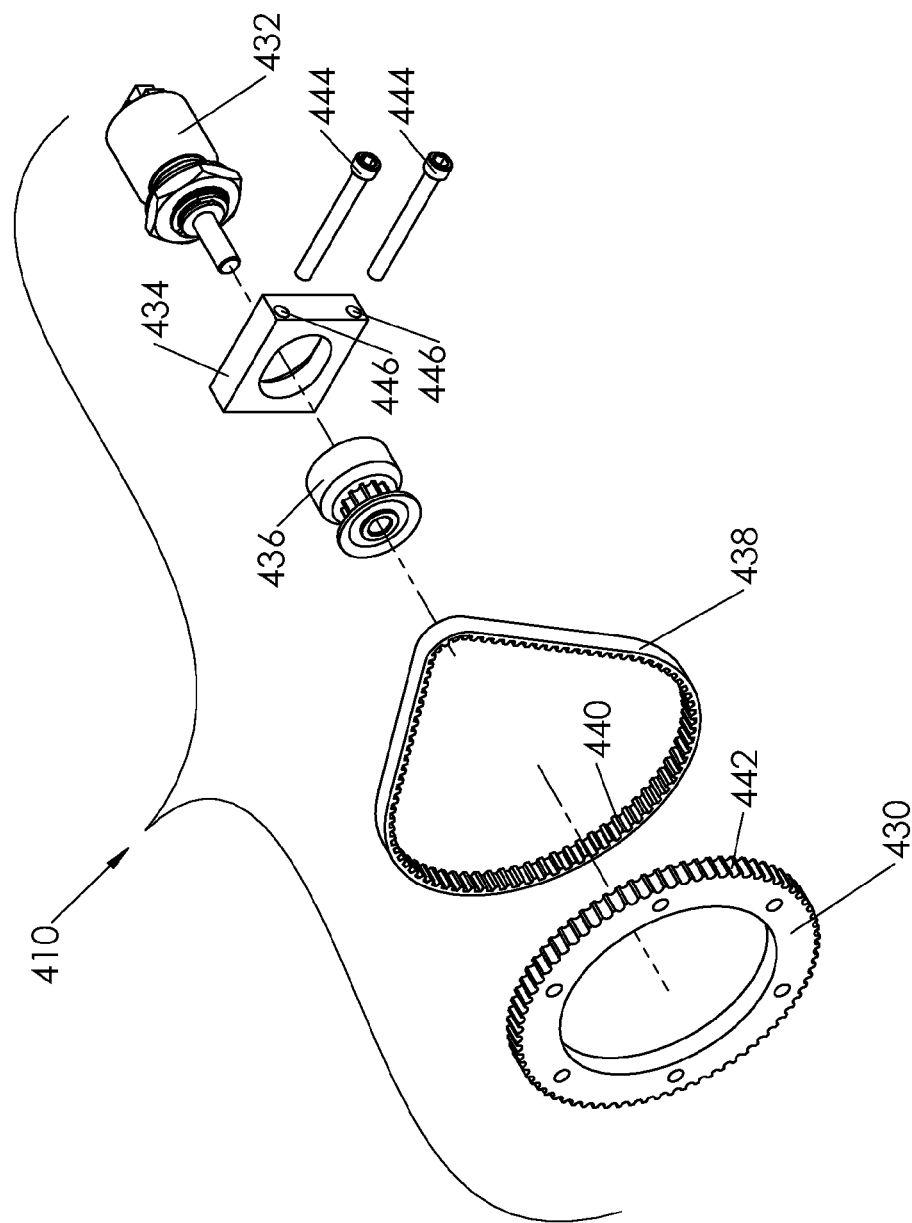
FIG. 4D is an exploded perspective view of the faceplate encoder assembly.

Refer now to FIG. 4D, which is an exploded perspective view of the faceplate encoder assembly 410. Here, the encoder drive gear 430 has rotational motion detected as follows. An encoder 432, mounted on an encoder block 434, terminates in an encoder gear 436. An encoder belt 438 with interior teeth 440 engages the encoder drive gear 430 on encoder drive gear teeth 442, and simultaneously engages encoder gear 436 teeth. The encoder belt 438 is flexible, so as to address any manufacturing tolerance mismatches. As designed, the encoder drive gear 430 teeth 442 and the encoder gear 436 teeth are coplanar, allowing the encoder belt 438 to detect with rotation of the encoder 432 rotations of the encoder drive gear 430. If slightly non-coplanar, the flexibility of the encoder belt 438 would still correctly operate.

Figure 4E:
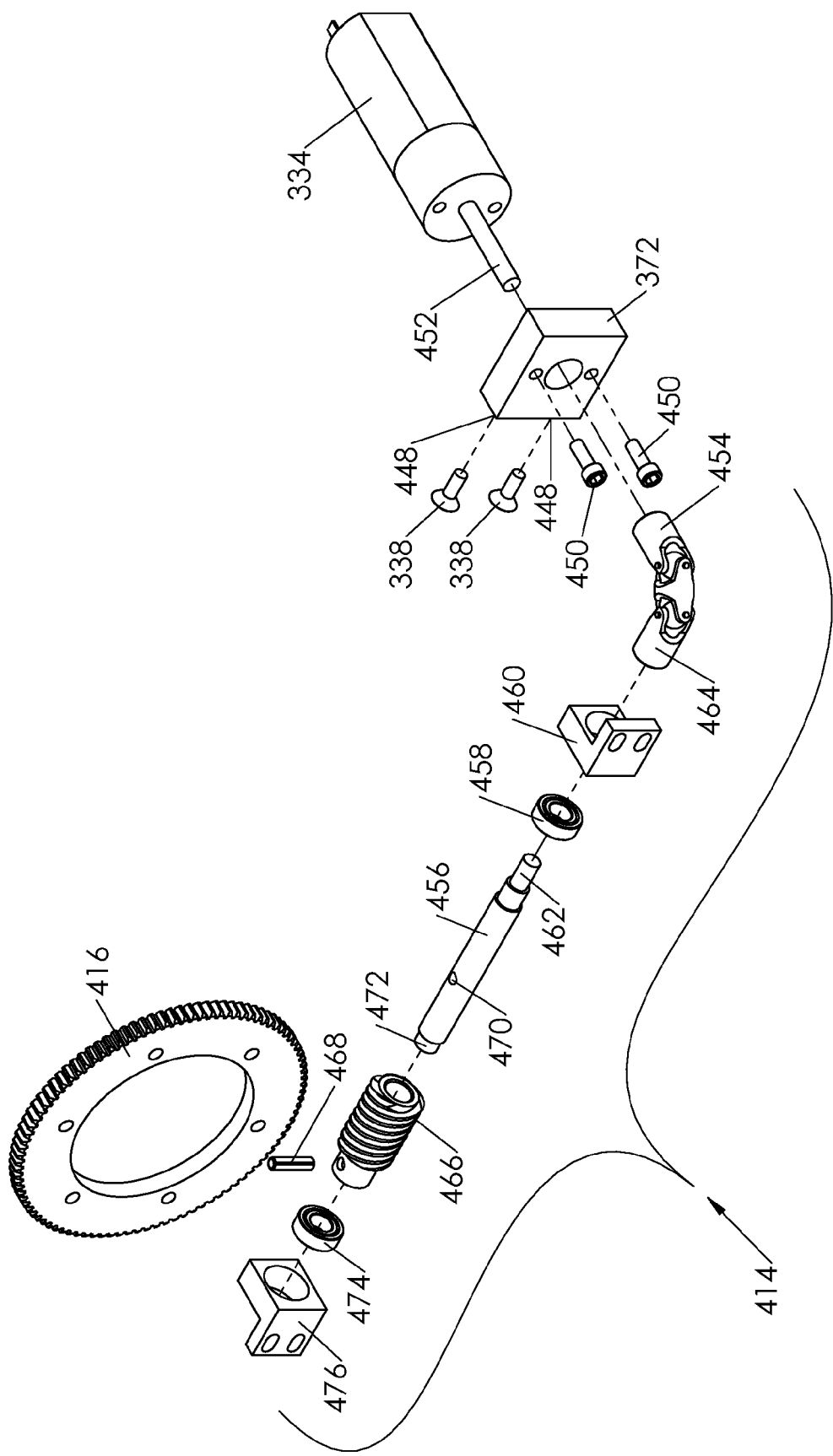
FIG. 4E is an exploded perspective view of the faceplate drive assembly.

Refer now to FIG. 4E, which is an exploded perspective view of the faceplate drive assembly 414. Starting with the faceplate motor 334 previously seen in FIGS. 4A and 4B, which is mounted to a motor block 448 via motor screws 450, the motor shaft 452 engages one end of a U-joint assembly 454.

Refer now to FIG. 4D and FIG. 3E. Mounting of the faceplate encoder assembly 410 is accomplished by passing two screws 444 through holes 446 in encoder block 434, which is then secured to holes 370 found in FIG. 3F.

It should be noted again that the faceplate motor 334 is mounted by motor fasteners 338 passing through the encoder outer section body 332 to be secured into threaded holes 448 in the motor block 372.

Off at substantially 90° relative to the faceplate motor 334, a drive shaft 456 is supported by a bearing 458 mounted into a bearing block 460. The drive shaft 456 has a driven end 462 that engages the other end 464 of the U-joint assembly 454. A worm 466 is slid over the drive shaft 456 and secured by press fitting a worm pin 468 into hole 470 on the drive shaft 456. A distal end 472 of the drive shaft 456 is supported by another bearing 474 mounted in a bearing block 476. When properly assembled, a rotation of the faceplate motor 334 causes rotation of the U-joint assembly 454, and a corresponding rotation of the drive shaft 456 and the worm 466. The rotation of the worm 466 in turn causes a geared down rotation of the hub worm gear 416.

The faceplate drive assembly 414 uses the worm gear 416 to gear down rotation of the faceplate motor 334, which has two advantages. First is that the hub 428 requires significant turning torque. Second is that worm gears 416 are not able to be driven back by their worm gear 416. Due to the nature of worm drives, the faceplate motor 334 doesn't require any output torque in order to keep the faceplate 406 stationary robot stationary or still, as in a pose.

The faceplate drive assembly 414 is geared down at 1:24. The center link pivot 308 of FIG. 3D is geared with a reduction ratio of 1:18 for pivoting the center link 200 relative to the outer link 300. The reason why the faceplate drive assembly 414 is geared down more than the center link pivot 308 is that it is likely that various diameters of wheels will be attached to the faceplate 406, some requiring a relatively large amount of torque in order to rotate.

It should be noted that there are several ways to design the bearing configuration for the faceplate 406. One could also use a combination of a sintered bronze bushing and a ball bearing with a hollow hub. Everything would bolt into the hub, including the drive gear. The same principles previously used apply as before.

Modular Robot Motions

Refer now to FIGS. 1A and 2A. The single modular robot unit 100 design significantly improves the mobility of individual modules as well as the mobility of modules when attached in clusters (also referred to as assemblies). By placing the axis of rotation of the faceplate 406 near to the pivot shaft 206 (which forms a pivot axis about which the center link 200 and outer link 300 relatively pivot) an imitation ball joint is substantially created. This is advantageous, because it only requires five modules to create a dog-like robot with articulated shoulders and haunches, as shown below. The center link 200 can arch up as though it were a back. Another method of locomotion with this configuration is to rotate all four feet out 90 degrees so the faceplates roll along the ground giving it four wheel drive, shown below. If a more challenging terrain presented itself, the robot could go back to walking with four legs. A camera with wireless communication as well as various sensors could be integrated into the robot modules.

A. "Inch Worming" Crawling

Refer now to FIG. 5, which is a perspective view of a series of still frames showing an "inch worm" motion used by the single modular robot unit 100 of FIG. 1A for crawling. The most basic motion for a single modular robot unit 100 is crawling. Although this will be described in a series of individual motions, it should be understood that this can also be a smooth continuous motion, much as living inch worms use.

At time t=0, we see the unarticulated form of the single modular robot unit 100. In order to initiate the crawling motion, at time t=1, the right end link 300 is pivoted relative to the center link 200. By simply this motion, it is seen that the single modular robot unit 100 has already begun moving to the right.

At t=2, the left end link 300 is seen to also be pivoted relative to the center link 200, causing the center link 200 to arch parallel to the ground.

At t=3, the right end link 300 is straightened out relative to the center link 200, causing still more movement toward the right.

At t=4, the left end link 300 is straightened out relative to the center link 200, causing again more movement toward the right. At this point, the single "inch" motion has been completed, and the single modular robot unit 100 is again in its unarticulated form, having traversed a distance of nearly half the overall length of the single modular robot unit 100.

This sequence may be repeated an arbitrary number of times to accomplish traversal of needed distances in a straight line that aligns from the left outer link 300 to the right outer link 300.

B. Driving

Refer now to FIG. 6A, where a sequence of perspective views 600 illustrate the driving operating mode, accomplished by continuously rotating the faceplates 406 (in the same direction) of the single modular robot 100 of FIG. 1A. In order to drive in a straight line, the faceplates 406 rotate forward at equal speeds. By driving the faceplates 406 in the same direction, but at different rates, a curved driving motion would be accomplished.

At t=0, we see the faceplates 406 in their nominal rest configuration 602, where they are both aligned with their respectively attached outer links 300.

At t=1/16, we see the faceplates 406 have rotated about 1/16 of a revolution from their nominal rest configuration at t=0.

Similarly, for t=2/16 and 3/16, the faceplates 406 have rotated 2/16 and 3/16 of a revolution.

At t=4/16, the faceplates 406 have completed 1/4 of a rotation, where the front edge of the single modular unit 100 has progressed about the width of the (without limitation) square faceplate 406. Datum 604 shows the progression of the forward driving movement.

C. Shrinking

Refer now to FIG. 6B, which is a perspective view of how to articulate the single modular robot unit 100 of FIG. 1A into a minimum width configuration.

At t=0, we see the unarticulated single modular robot unit 100.

At t=1, the outer links 300 have both begun pivoting relative to the center link 200, but in opposite directions.

Finally, at t=2, we see that the outer links 300 have now formed opposite 90° angles relative to the center link 200.

During the process of shrinking the single modular robot unit 100, the overall end-to-end distance $D_0$ of the single modular robot unit 100 has shrunk to the much shorter $D_1$ end-to-end distance, which approaches about ½ as long.

It should also be noted that the orientation of the center link 200 in this FIG. 6B is now horizontal, as opposed to the previous vertical orientation in FIG. 6A. To accomplish this horizontal to vertical change in orientation, the device has to be physically rolled over 90°. Should such motion be required, it may be accomplished by additional single modular robot units 100 added to form a cluster.

Restating the above, a reduced $D_1$ end-to-end distance is accomplished by rotating the forward outer link 300 section 90° and the rearward outer link 300 section −90° relative to the center link 200, and then rotating the faceplates 406 forward. This articulation reduces the overall footprint of the modular robot, allowing it to maneuver in narrower areas. While the faceplates rotate at equal speeds the single modular robot unit 100 can turn by articulating its body.

D. Spinning

Refer now to FIG. 6C, which is a perspective view of how the single modular robot unit 100 of FIG. 1A may be made to pivot about an axis at one end.

At t=0, we see the unarticulated single modular robot unit 100, with faceplates 406 aligned with their respective outer links 300. To better track and understand the motion, an asterisk 606 is placed on one of the outer links 300 to differentiate between the two otherwise identical outer links 300. The rotation axis 608 gives a relative axis through which the single modular robot unit 100 rotates.

At t=1, we see that the faceplate 406 of the marked 606 outer link 300 has begun rotating, where the other outer link 300 faceplate 406 remains stationary. Thus, the marked 606 begins pivoting the single modular robot unit 100 about rotation axis 608.

At t=2, we see that the faceplate 406 of the marked 606 outer link 300 rotated ¼ of a revolution, where the other outer link 300 faceplate 406 has remained stationary. Thus, the marked 606 has begun pivoting the single modular robot unit 100 about rotation axis 608.

At t=3, we see that the faceplate 406 of the marked 606 outer link 300 rotated about ⅜ of a revolution, where the other outer link 300 faceplate 406 has remained stationary. It should be noted that rotation axis 608 still remains constant.

By using this form of motion, it is possible to rotate the single modular robot unit 100 about one end an arbitrary number of revolutions.

Should a still further reduced turning radius be required, by driving the faceplates 406 in opposite directions, the single modular robot unit 100 may be made to rotate within its own body length.

E. Arching and Driving

Refer now to FIG. 6D, which is a perspective view of a sequence of arching and driving the single modular robot unit of FIG. 1A. Here, at time t=0, we see the single modular robot unit 100 in its unarticulated position.

At t=1/16, we see the faceplates 406 of both outer links 300 have rotated 1/16 of a revolution. Also, the outer links 300 have pivoted relative to the center link 200 to cause the center link 200 to rise, and the single modular robot unit 100 to take on an arched configuration 610.

At t=2/16, the faceplates 406 have rotated 2/16 of a revolution. Similarly, at t=3/16, the faceplates 406 have rotated 3/16 of a revolution.

Finally, at t=4/16, we see that the faceplates 406 have rotated 4/16 of a revolution, or ¼ of a revolution.

The arched configuration 610, which was assumed at t=1/16 or prior, is useful to provide additional ground clearance for the center link 200. This is particularly useful in rough terrain, as the faceplates 406 are positioned at a more aggressive angle of engagement with the ground.

With equal rotational speeds, and opposite rotations, faceplates 406 will drive the single modular robot 100 in a direction 612 perpendicular to the long axis of the single modular robot 100.

F. Panning and Tilting

Refer now to FIG. 6E, which is a perspective view of a sequence of motions taken by the single modular robot unit 100 of FIG. 1A called the "camera view" motion. In this motion, the single modular robot unit 100 lifts itself into a camera platform. This is a capability unique to this single modular robot unit 100 design and is made possible by the rotating faceplate 406. To better track and understand the motion, an asterisk 614 is placed on one of the outer links 300.

At t=0, the unarticulated single modular robot unit 100 is shown is flat on the ground, with the faceplates 406 aligned with their respective outer links 300.

At t=1, the single modular robot unit 100 has rotated its non-asterisked outer link 300 down until the faceplate 406 is flat on the ground.

At t=2, the non-asterisked outer link 300 faceplate 406 has been rotated ⅛ of a turn relative to the outer link 300. This essentially lengthens a lifting base of the faceplate 406, and allows the single modular robot unit 100 to stand up.

At t=3, the asterisked 614 outer link 300 has now been pivoted less than 90° relative to the center link 200. It has to pivot less than 90° relative to the center link 200 since the faceplate 406 of the non-asterisked outer link 300 would otherwise interfere with it.

At t=4, the center link 200 has pivoted 90° relative to the non-asterisked outer link 300. The net effect is that the single modular robot unit 100 has now "stood up".

At t=5, we now see that the asterisked 614 outer link 300 is free to rotate around in any direction. By pivoting the asterisked 614 outer link relative to the center link 200, it is additionally possible to look upward; thereby pointing a camera mounted on the asterisked 614 outer link 300 faceplate 406 for coverage through a complete half spherical region. Using traditional camera terminology, the single modular robot unit 100 can tilt using the pivot joints of the center link 200 relative to the upper outer link 300, and pan by using the faceplate 406 on the ground to turn the single modular robot unit 100.

Future single modular robot unit 100 designs will likely have a camera mounted within the faceplate 406, and peering out through the aperture 402 (previously shown in FIG. 4A), allowing an operator to view the environment from a slightly taller perspective than when crawling.

Clustering

Refer now to FIG. 7A, which is a perspective view of a cluster of five assembled 700 single modular robot units 100 of FIG. 1A. This may also be referred to as a "cluster" of five assembled single modular robot units 100 of FIG. 1A Refer now to FIG. 7B, which is a partially exploded perspective view of the five assembled single modular robot units 100 of FIG. 7A. Here, four of the single modular robot units 100 are aligned in the same manner, and mounted to a central single modular robot unit 100 that is oriented at 90° relative to the remaining single modular robot units 100. These five assembled single modular robot units 100 have an aggregate of 5×4=20 degrees of freedom for extensive flexibility in articulations.

Figure 7D:
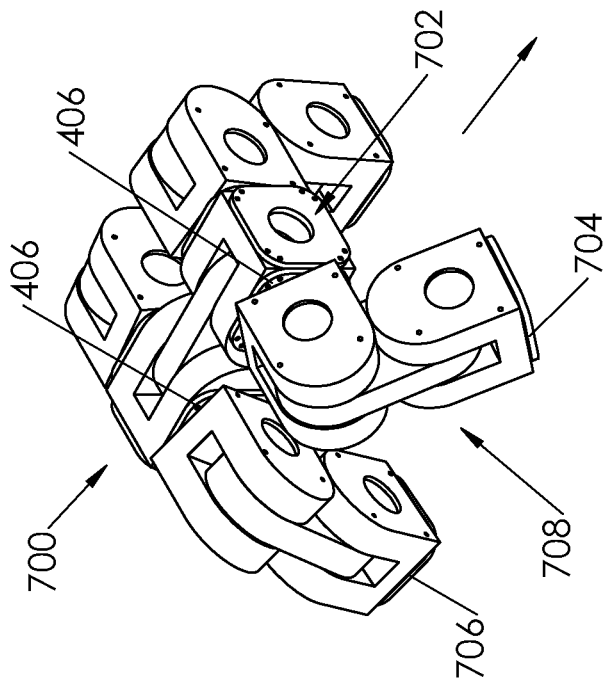
FIG. 7D is a perspective view of the cluster of five assembled single modular robot units of FIG. 7A in a "walking" pose.
Figure 7C:
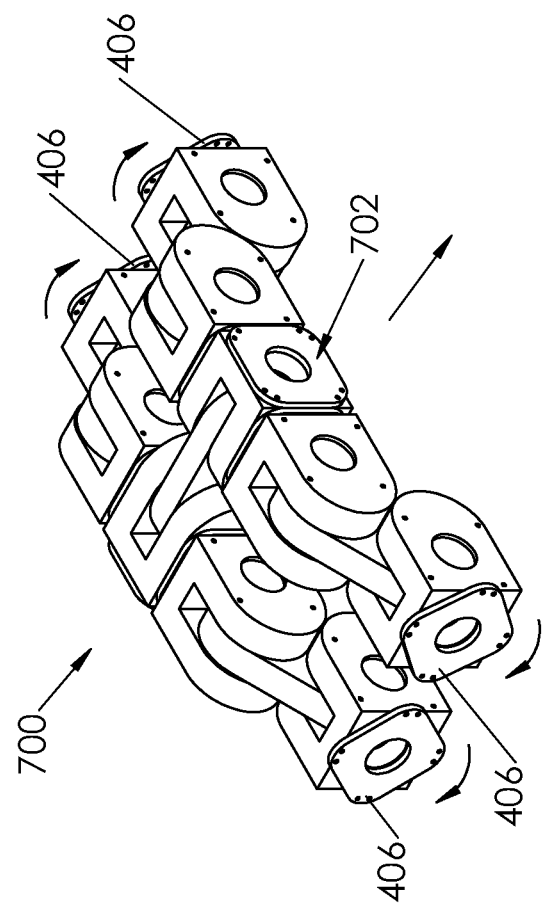
FIG. 7C is a perspective view of the cluster of five assembled single modular robot units of FIG. 7A in a "four wheel drive" pose.

Refer now to FIG. 7C, which is a perspective view of the cluster of five assembled 700 single modular robot units 100 of FIG. 7A in a "four wheel drive" pose. Here the central unit 702 has been raised off the ground, and all of the distal faceplates 406 are rotating in the same direction at the same rate.

Refer now to FIG. 7D, which is a perspective view of the cluster of five assembled 700 single modular robot units 100 of FIG. 7A in a "walking" pose. Here the central unit 702 has been raised off the ground, and all of the distal faceplates 406 (for example, now annotated as 704 and 706) are positioned aligned with their respective outer links 300. In this orientation, a "leg" 708 is moved forward by pivoting off of its central faceplate 406.

With 20 degrees of freedom, it is clear that a very large number of distinct body positions and driving modes may be utilized, creating a highly manipulable and maneuverable device. The descriptions here only begin to show this flexibility.

Figure 8A:
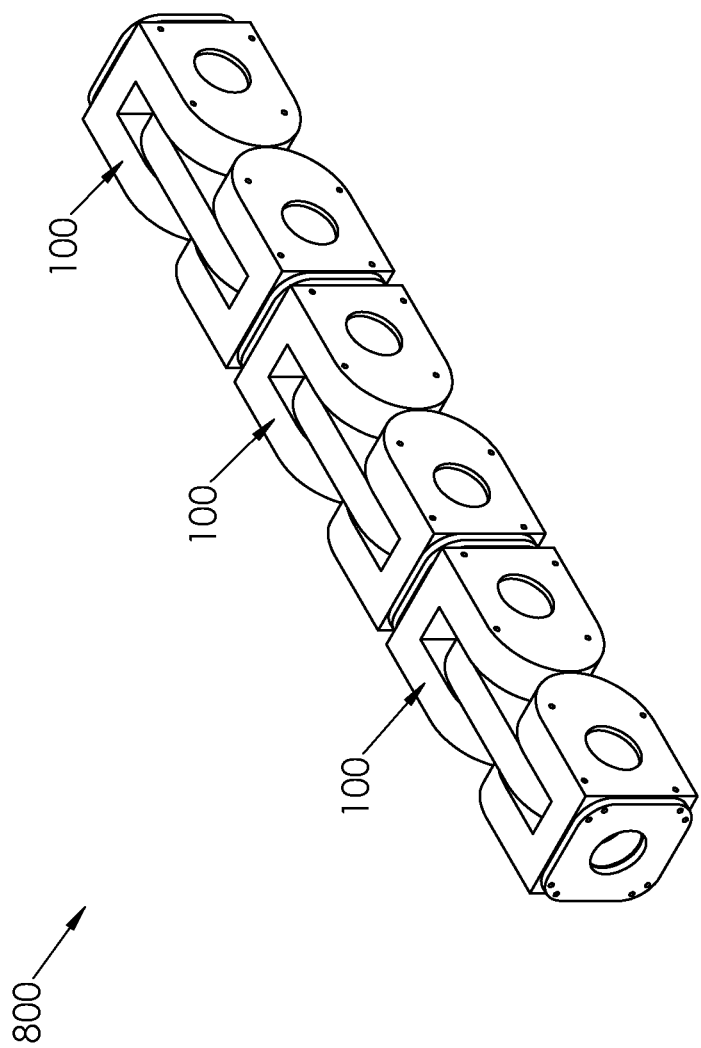
FIG. 8A is a perspective view of a cluster of three single modular robot units linked faceplate to faceplate forming a "snake" or "worm" configuration.

Refer now to FIG. 8A, which is a partially exploded perspective view of a cluster of three single modular robot units 100 linked faceplates 406 to faceplates 406 forming a "snake" or "worm" configuration.

Refer now to FIG. 8B, which is an exploded perspective view of the cluster of three single modular robot units 100 linked faceplate 406 to faceplate 406 of FIG. 8A.

Refer now to FIG. 8C, which is a perspective view of an articulation of the "snake" 804 configuration of FIG. 8A, which may be used for elevated viewing. Here, the "snake" 804 is posed in an adaptable inspection position. The "snake" 804 can crawl through rough terrain as an elongated form shown in FIG. 8A, and then look up and into hard to reach locations. Search and rescue in rubble would likely be a great practical application for the "snake" 804.

The articulation of the "snake" 804 is accomplished as follows. An end unit 806 has assumed a camera platform-type pose previously described in FIG. 6E. The end unit 806 is mounted to a central unit 808, which has rotated one outer link 300 relative to its center link 200. This motion mimics the looking up of a snake.

Figure 9A:
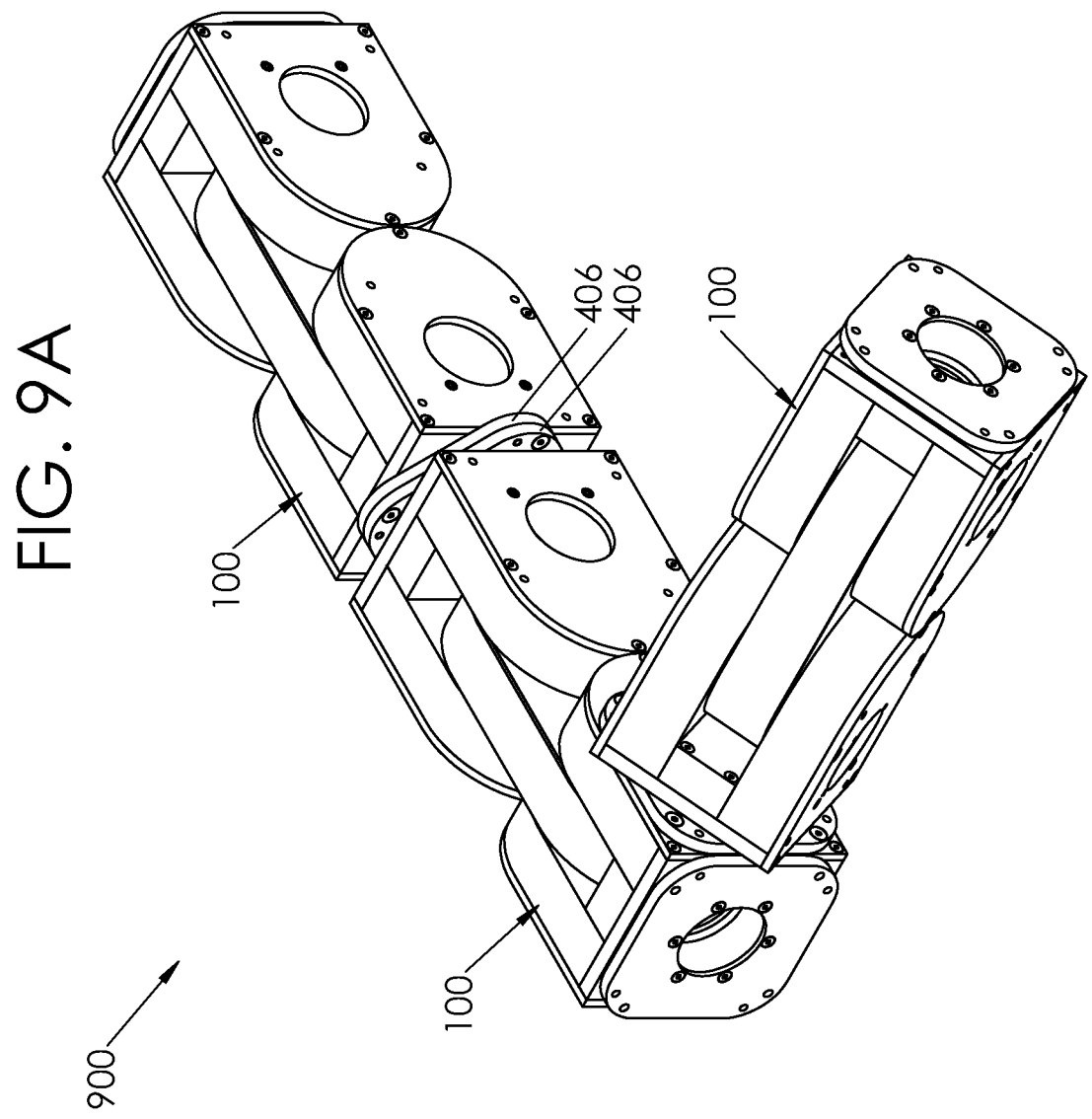
FIG. 9A is a perspective view of a cluster of three single modular robot units of FIG. 1A, with two of them linked faceplate to faceplate, and a third single modular robot unit 100 mounted at 90° relative to the first two, thereby forming an "L" configuration.

Refer now to FIG. 9A, which is a perspective view of a cluster of three 900 single modular robot units 100 of FIG. 1A, with two of them linked faceplate 406 to faceplate 406, and a third single modular robot unit 100 mounted at 90° relative to the first two, thereby forming an "L" configuration.

Refer now to FIG. 9B, which is a partially exploded perspective view 902 of the cluster of three 900 single modular robot units 100 linked in the "L" configuration of FIG. 9A.

Here it is seen that flathead screws 904 link an end 906 single modular robot unit 100 to a central 908 single modular robot unit 100. A tangential 910 single modular robot unit 100 mounts to the central 908 single modular robot unit 100.

In this cluster of three 900 single modular robot units 100, a faceplate 912 of the end 906 single modular robot unit 100 connects to a faceplate 914 of central 908 single modular robot unit 100.

The tangential 910 single modular robot unit 100 mounts to the central 908 single modular robot unit 100 differently. Here, the side 916 of the central 908 single modular robot unit 100 is used as a base for the attachment of the faceplate 918 of the tangential 910 single modular robot unit 100. The side 916 may either be an encoder side cover 336, or, if it is the other side, the side cover 306. In order to attach these parts, it is first necessary to turn the faceplate 918 so as to expose the faceplate 918 countersunk mounting holes 920.

Novel Connecting Method Between Single Modular Robot Units

Single modular robot unit 100 work best when they have a standardized mounting method that accommodates quick assembly without risk of falling apart when in use. The method used here for interconnecting single modular robot units 100 is to rotate the faceplate 406 to a position about 45° from the position flush with its respective outer link 300, and mount from the outer link 300 side of the faceplate 406 using four screws. The countersunk mounting holes 920 need to be countersunk so that the faceplate 406 may freely rotate once attached. The four countersunk mounting holes 920 and corresponding four threaded holes 922 (in the outer link 300 where it will be attached) are symmetrically offset so faceplates 406 can mount to other faceplates 406, as well as to the sides of other single modular robot units 100.

Radiused Edges of the Faceplate

Refer back to FIGS. 6A-6D, in particular to the faceplates 406. Because of the radiused edges of the faceplates 406, the single modular robot unit 100 is able to be driven forward by rotating both faceplates 406 in the same direction. The radiused edges of the faceplate 406 prevent the single modular robot unit 100 from violently rising up and slapping down to the ground as would be the case if the faceplate 406 were simply square. Also, the geometries of the outer links 300 restrains the single modular robot unit 100 from spinning in the air when one or both of the faceplates 406 rotate.

Embodiments of the present invention are described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

From the discussion above it will be appreciated that the invention can be embodied in various ways, including the following:

1. A module, comprising: a center link; an outer link pivotably connected to the center link; and a faceplate rotationally connected to the outer link.

2. The module of embodiment 1, wherein the faceplate rotates about the outer link about a faceplate rotation axis.

3. The module of embodiment 1, wherein the outer link is pivotably connected to the center link through a pivot shaft disposed between the outer link and the center link.

4. The module of embodiment 3, wherein the pivot shaft has a pivot axis about which the center link pivots relative to the outer link.

5. The module of embodiment 1, further comprising a faceplate assembly, said faceplate assembly comprising: a frame connected to the outer link; said faceplate rotationally connected to the frame; wherein the faceplate rotates about the outer link about a faceplate rotation axis.

6. The module of embodiment 1, wherein one of the center links is pivotably connected to two of the outer links.

7. The module of embodiment 6, wherein the outer links are pivotably connected to the center link through two pivot shafts.

8. The module of embodiment 1, further comprising a modular robot unit, said modular robot unit comprising at least two outer links interconnected by their respective faceplates.

9. The module of embodiment 8, wherein the two outer links are interconnected through a connector.

10. The module of embodiment 1, further comprising a modular robot unit, said modular robot unit comprising at least two outer links pivotably connected to one center link.

11. The module of embodiment 10, wherein the at least two outer links are pivotably connected to the one center link through two pivot shafts.

12. The module of embodiment 1: wherein the outer link pivotably connects to the center link about a pivot axis; wherein the faceplate rotationally connects to the outer link about a rotation axis; and wherein the pivot axis and the rotation axis are linearly independent.

13. The module of embodiment 12, wherein the pivot axis and the rotation axis are substantially orthogonal.

14. The module of embodiment 1, where the faceplate is continuously rotatable.

15. The module of embodiment 1, wherein the faceplate comprises an aperture wherein signals may pass.

16. The module of embodiment 15, wherein the signals comprise one or more signals selected from the group of signals consisting of control, communications, power, audio, video, tactile feedback, haptic feedback, sensor, digital, and analog signals.

17. The module of embodiment 1, wherein the outer link comprises a faceplate motor able to rotate the faceplate.

18. The module of embodiment 17, wherein the outer link comprises: a center link pivot disposed within the outer link; wherein the center link pivot is able to pivot the center link relative to the outer link.

19. The module of embodiment 18, further comprising: a battery disposed within the center link; wherein the battery provides power for the faceplate motor and the center link pivot.

20. The module of embodiment 1, wherein the faceplate rotatably connects to the outer link through a frame connected to the outer link through a rotatable connection, said rotatable connection comprising: a cylindrical thrust bearing disposed between the frame and the faceplate; a landed recess disposed on the frame; a radial bearing disposed at least partially within the landed recess; a hub attached to the faceplate that sequentially passes through the radial bearing, the frame, the cylindrical thrust bearing, and then attaches to the faceplate; and an encoder drive gear and a worm gear attached to the hub; wherein a rotation of the drive gear results in a corresponding rotation of the faceplate relative to the frame.

21. A four degree-of-freedom (4-DOF) robot module, comprising: (a) a center link; (b) two outer links, each outer link pivotably connected to the center link through a corresponding center link pivot; (c) a faceplate encoder assembly mounted to each outer link that detects rotation of the faceplate; (d) a pivot axis through which the center link pivots relative to each outer link; and (e) a faceplate assembly, comprising: (i) a frame connected to each outer link; and (ii) a rotatable connection that rotatably connects each of the outer links through the frame to a faceplate; (iii) wherein each faceplate rotates about a faceplate rotation axis substantially orthogonal to the pivot axis of the outer link to which it is mounted; (f) wherein the center link pivots and the faceplate rotations form a four degree-of-freedom (4-DOF) single modular robot unit.

22. The four degree-of-freedom (4-DOF) robot module of embodiment 21, wherein each faceplate comprises a radiused substantially square plate.

23. The four degree-of-freedom (4-DOF) robot module of embodiment 21, wherein rotation of the faceplate may produce motion in the 4-DOF single modular robot unit.

24. The four degree-of-freedom (4-DOF) robot module of embodiment 21, wherein a wheel is attached to and rotated by the faceplate.

25. A method of articulating a module, comprising: (a) providing a module, said module comprising: (i) a center link; (ii) two outer links pivotably attached to the center link; and (iii) a faceplate rotationally attached to each outer link; (b) pivoting one or both outer links relative to the center link; and (c) rotating one or both faceplates.

26. The method of articulating the module of embodiment 25, further comprising driving the module in a substantially straight line by rotating the faceplates at the same rate, in the same direction.

27. The method of articulating the module of embodiment 26, wherein the same direction is relative to the module to which the faceplates are attached.

28. The method of articulating the module of embodiment 26, further comprising driving the module in a curve by rotating the faceplates at different rates, but in the same direction.

29. The method of articulating the module of embodiment 25, further comprising turning the module substantially inside its overall length by rotating the faceplates in opposite directions.

30. The method of articulating the module of embodiment 25, wherein the module is a component of an assembly of two or more modules.

31. A module comprising: two outer links; and means for articulating the two outer links.

32. The module of embodiment 31, wherein the means for articulating comprises: a center link pivotably connected to each outer link; and a faceplate rotationally connected to each outer link.

33. A module, comprising: a center link; two outer links; means for independently articulating the center link pivotably connected to each outer link, to create two degrees of freedom (2-DOF); and means for rotating a faceplate relative to each outer link, to create two more degrees of freedom (2-DOF); wherein the means for independently articulating and the means for rotating create a module with a total of four degrees of freedom (4-DOF).

34. The module of embodiment 33, wherein the two outer links are substantially identical.

35. The module of embodiment 33, wherein said module forms a single modular robot unit.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A four degree-of-freedom (4-DOF) single robot unit module, comprising:
   (a) a center link having first and second ends;
   (b) a first outer link pivotably connected to the first end of the center link about a first pivot axis;
   (c) a second outer link pivotably connected to the second end of the center link about a second pivot axis;
   (d) a first planar faceplate rotationally connected to the first outer link;
   (e) a second planar faceplate rotationally connected to the second outer link;

(f) wherein each said faceplate is rotatable about a faceplate rotation axis that is substantially orthogonal to the pivot axis of the outer link to which the faceplate is connected;

(g) wherein each said faceplate is detachably connectable to a like faceplate in another module by a faceplate-to-faceplate connection; and (h) wherein each said outer link comprises a first section and a second section with an interior space therebetween, and wherein each end of the center link is positioned in the interior space between the sections of one of said outer links;

(i) wherein each said outer link includes a faceplate motor and drive gear assembly that rotates the faceplate connected to said outer link relative to each said outer link;

(j) whereby pivot motion of the outer links about their respective pivot axis and rotational motion of the faceplates about their respective rotation axis establishes four degree-of-freedom (4-DOF) motion in a single robot unit module.

2. The module of claim 1, wherein at least one of said outer links is pivotably connected to the center link through a pivot shaft disposed between the said one outer link and the center link.

3. The module of claim 1, wherein each said outer link is connected to its faceplate by a faceplate assembly, said faceplate assembly comprising:
 a frame connected to the outer link;
 said faceplate rotationally connected to the frame;
 wherein the faceplate rotates about the outer link about its faceplate rotation axis.

4. The module of claim 1, wherein at least one faceplate is continuously rotatable.

5. The module of claim 1, wherein at least one faceplate comprises an aperture wherein signals may pass.

6. The module of claim 5, wherein the signals comprise one or more signals selected from the group of signals consisting of control, communications, power, audio, video, tactile feedback, haptic feedback, sensor, digital, and analog signals.

7. The module of claim 1, further comprising:
 a battery disposed within the center link;
 wherein the battery provides power for the faceplate motor.

8. The module of claim 1, wherein at least one said faceplate comprises a radiused substantially square plate.

9. A four degree-of-freedom (4-DOF) single robot unit module, comprising:
 (a) a center link having first and second ends;
 (b) a first outer link pivotably connected to the first end of the center link about a first pivot axis;
 (c) a second outer link pivotably connected to the second end of the center link about a second pivot axis;
 (d) a first planar faceplate rotationally connected to the first outer link;
 (e) a second planar faceplate rotationally connected to the second outer link;
 (f) wherein each said faceplate is rotatable about a faceplate rotation axis that is substantially orthogonal to the pivot axis of the outer link to which the faceplate is connected;
 (g) wherein each said faceplate is detachably connectable to a like faceplate in another module by a faceplate-to-faceplate connection;
 (h) wherein each said outer link comprises a first section and a second section with an interior space therebetween, and wherein each end of the center link is positioned in the interior space between the sections of one of said outer links;
 (i) wherein each said outer link includes a faceplate motor and drive gear assembly that rotates the faceplate connected to said outer link relative to each said outer link; and
 (j) wherein each said outer link includes a faceplate encoder assembly that detects rotation of the faceplate connected to said outer link;
 (k) whereby pivot motion of the outer links about their respective pivot axis and rotational motion of the faceplates about their respective rotation axis establishes four degree-of-freedom (4-DOF) motion in a single robot unit module.

10. A modular assembly, comprising:
 (a) a first module; and
 (b) a second module;
 (c) wherein each said module comprises:
  (i) a center link having first and second ends;
  (ii) a first outer link pivotably connected to the first end of the center link about a first pivot axis;
  (iii) a second outer link pivotably connected to the second end of the center link about a second pivot axis;
  (iv) a first planar faceplate rotationally connected to the first outer link;
  (v) a second planar faceplate rotationally connected to the second outer link;
  (vi) wherein each said faceplate is rotatable about a faceplate rotation axis that is substantially orthogonal to the pivot axis of the outer link to which the faceplate is connected;
  (vii) wherein each said faceplate is detachably connectable to a like faceplate in another module by a faceplate-to-faceplate connection; and
  (viii) wherein each said outer link includes a faceplate motor and drive gear assembly that rotates the faceplate connected to said outer link relative to each said outer link;
  (ix) whereby pivot motion of the outer links about their respective pivot axis and rotational motion of the faceplates about their respective rotation axis establishes four degree-of-freedom (4-DOF) motion in a single robot unit module;
 (d) wherein a faceplate on said first module is connected to a faceplate on said second module at a faceplate-to-faceplate interface; and
 (e) wherein said first module is rotatable relative to said second module.

* * * * *